United States Patent [19]
Thornton et al.

[11] Patent Number: 5,870,609
[45] Date of Patent: Feb. 9, 1999

[54] TECHNIQUE FOR BOOTSTRAPPING EXECUTABLE CODE TO AN ADAPTER

[75] Inventors: Timothy J. Thornton, Camarillo; Robert Rosen, Agoura Hills; Eric K. Henderson, Agoura, all of Calif.

[73] Assignee: Xircom, Inc., Thousand Oaks, Calif.

[21] Appl. No.: 339,408

[22] Filed: Nov. 14, 1994

Related U.S. Application Data

[63] Continuation-in-part of Ser. No. 170,088, Dec. 17, 1993, Pat. No. 5,408,614.

[51] Int. Cl.$^6$ .................................................. G06F 13/14
[52] U.S. Cl. ........................................ 395/712; 395/681
[58] Field of Search ................................ 395/650, 700, 395/712, 652, 681

[56] References Cited

U.S. PATENT DOCUMENTS

| | | | |
|---|---|---|---|
| 5,202,963 | 4/1993 | Zelley | 395/651 |
| 5,237,690 | 8/1993 | Bealkowski et al. | 395/651 |
| 5,249,218 | 9/1993 | Sainton | 379/59 |
| 5,367,563 | 11/1994 | Sainton | 379/59 |
| 5,412,798 | 5/1995 | Garney | 395/651 |
| 5,446,898 | 8/1995 | Bealkowski et al. | 395/651 |
| 5,537,607 | 7/1996 | Ploger, III | 395/830 |
| 5,623,604 | 4/1997 | Russell et al. | 395/712 |
| 5,664,231 | 9/1997 | Postman et al. | 395/893 |

*Primary Examiner*—James P. Trammell
*Assistant Examiner*—John Q. Chavis
*Attorney, Agent, or Firm*—Loeb & Loeb LLP

[57] ABSTRACT

A method of bootstrapping executable code to a microprocessor controller from a personal computer (PC) via a bidirectional interface, e.g., a standard PC parallel port comprised of an external 25-pin D-shell connector. By bootstrapping its code from the PC, the microprocessor controller, which controls an adapter, e.g., a modem adapter, coupled to the PC is able to retrieve the most current version of code stored in the PC.

46 Claims, 28 Drawing Sheets

1. Out instruction to data port.
2. Trap by redirector.
3. Send data to adapter.

FIG. 5A

1. In instruction from data port.
2. Trap by redirector.
3. Read data from the adapter.
   (Data may have already arrived and was stored; in this case the redirector will simply return what was stored.)

FIG. 5B

1. In instruction from status port.
2. Trap by redirector.
3. Get adapter status; translate it into UART status; return that value.

FIG. 5C

1. Out instruction to control port.
2. Trap by redirector.
3. Translate it into an analogous control command to send to the adapter.

FIG. 5D

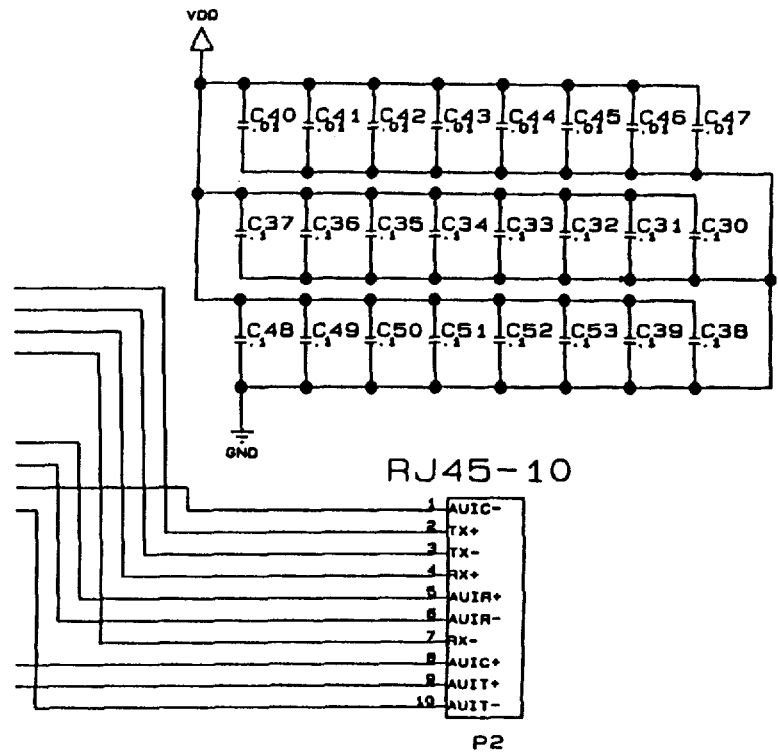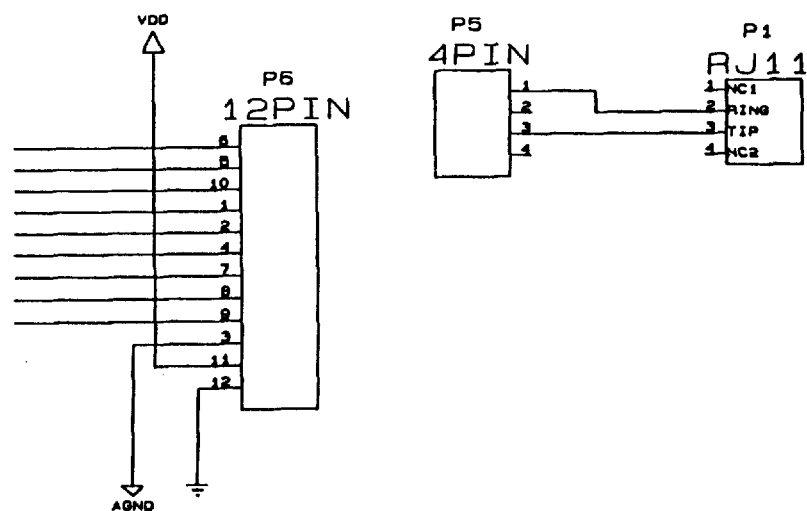
FIG. 13C

TECHNIQUE FOR BOOTSTRAPPING EXECUTABLE CODE TO AN ADAPTER

This application is a continuation in part of application Ser. No. 08/170,088 filed Dec. 17, 1993, now U.S. Pat. No. 5,408,614 issued Apr. 18, 1995.

BACKGROUND OF THE INVENTION

The present invention relates generally to adapters configured for connection to a personal computer (PC), e.g., modem adapters used to connect a PC to public switched telephone networks (PSTNs).

Conventional adapters, e.g., modem adapters, are controlled by microprocessors executing code stored in local nonvolatile memory, e.g., ROM, such that their code, i.e., software, can only be modified by replacing the nonvolatile memory device. Although, some nonvolatile memory devices, e.g., EPROMs, can be removed, reprogrammed and reinserted, such a task is difficult for most consumers and thus limits the ability to upgrade the adapter's software in the field to enhance or correct discovered bugs.

SUMMARY OF THE INVENTION

The present invention is directed toward a method and apparatus for bootstrapping executable code to a microprocessor controller from a personal computer (PC). By bootstrapping its code from the PC, the microprocessor controller, which can be used to control an adapter such as a modem adapter, is able to retrieve the most current version of the code stored in the PC.

A preferred method of bootstrapping executable code to an adapter's microprocessor controller from a personal computer (PC) in accordance with the invention includes the steps of (1) enabling the controller to fetch and execute bytes from the PC via its standard parallel port; (2) loading the controller's local memory with executable instructions fetched from the PC; and (3) causing said controller to execute said executable instructions from its local memory to control said adapter.

The preferred embodiment is applicable to various types of PC adapters including, tape controllers, SCSI controllers, Ethernet controllers, pagers, test equipment, communication controllers, LAN adapters and LAN/modem adapters.

Other features and advantages of the present invention should become apparent from the following description of the presently-preferred embodiments, taken in conjunction with the accompanying drawings, which illustrate, by way of example, the principles of the present invention.

BRIEF DESCRIPTION OF THE DRAWINGS

FIGS. 5A–5D are flow charts depicting examples of the operation of the redirector software;

DESCRIPTION OF THE PREFERRED EMBODIMENTS

Figure 1:
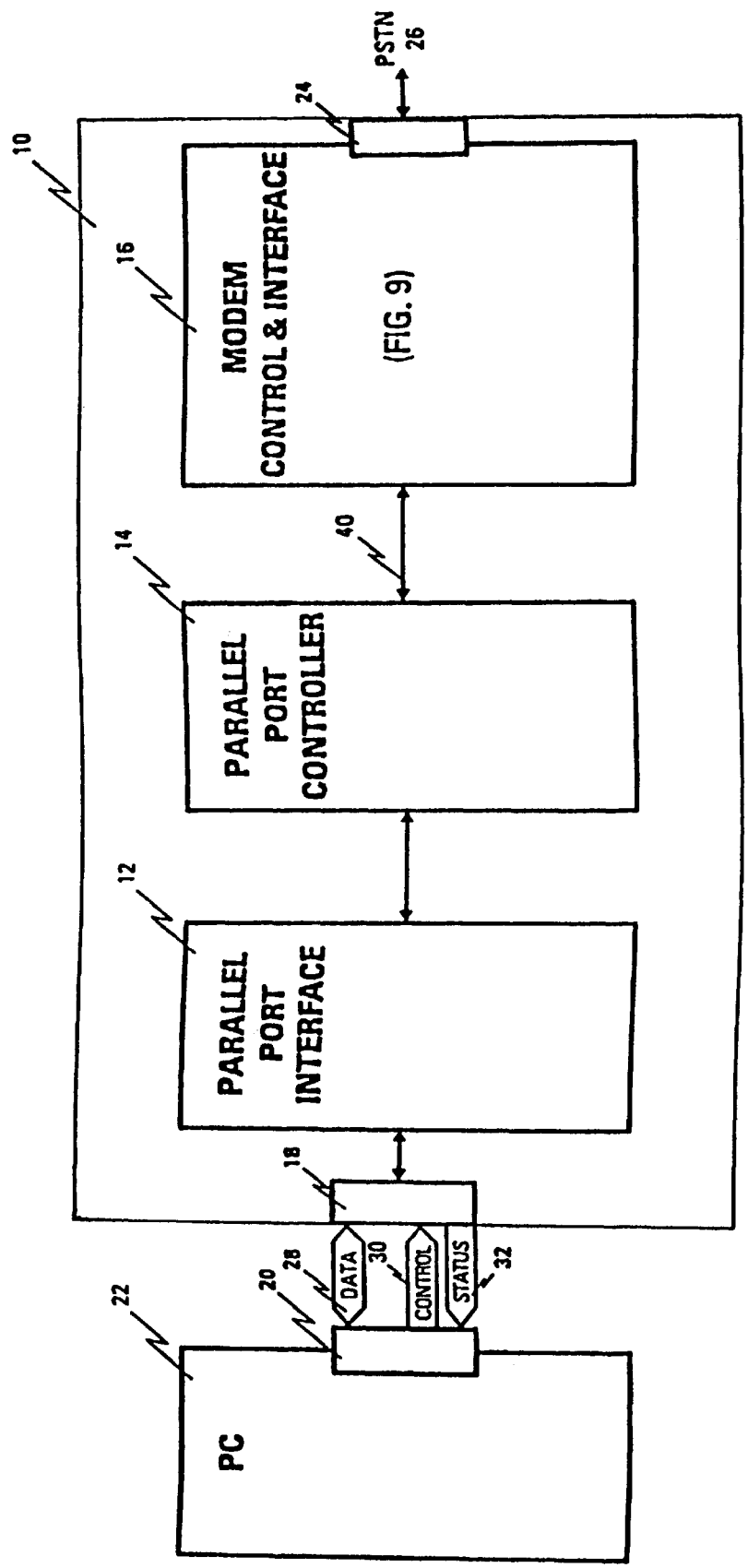
FIG. 1 comprises a functional block diagram of a preferred modem adapter in accordance with the present invention.

FIG. 1 depicts a block diagram of a preferred modem adapter 10 in accordance with the present invention useful for connecting a personal computer, e.g., IBM and compatible personal computers (PCs), to a public switched telephone network (PSTN), sometimes referred to as a wide area network (WAN). Such a personal computer is typically controlled by an internal microprocessor (e.g., an Intel 80x86) and has an externally accessible parallel port (e.g., standard or "Centronics") interfaced to the PC via its internal bus.

The modem adapter 10 may appropriately be considered as being primarily comprised of three functional portions; i.e., a parallel port interface 12, a parallel port controller 14, and a modem control and interface 16. The parallel port interface 12 is coupled to a parallel port connector 18 physically and electrically configured to interface to a female connector of a standard PC parallel port 20 on PC 22. The parallel port controller 14 is coupled to the parallel port interface 12 and functions to bidirectionally transfer data to the standard PC parallel port 20. The parallel port controller 14 is also coupled to the modem control and interface 16 to bidirectionally transfer data therewith. The interface modulates data sent to and demodulated data received from the PSTN (typically according to CCITT defined specifications) preferably via an RJ-11 connector 24 which is coupled to the PSTN 26.

The function and operation of the parallel port controller 14 in coordination with the parallel port interface 12 for use with a standard PC parallel port is described in the aforementioned parent application 08/117,990. The physical interface between parallel port connectors 18, 20 is comprised of eight-bit data path 28, a four-bit control path 30 and a five-bit status path 32. The definition of the standard signals found the 25-pin standard PC parallel port 20 is found in Table 1.

TABLE 1

| DB-25 | Pin Definition | Type |
| --- | --- | --- |
| 1 | strobe | control, RDS |
| 2 | data bit 0 | data |
| 3 | data bit 1 | data |
| 4 | data bit 2 | data |

TABLE 1-continued

| DB-25 | Pin Definition | Type |
|---|---|---|
| 5 | data bit 3 | data |
| 6 | data bit 4 | data |
| 7 | data bit 5 | data |
| 8 | data bit 6 | data |
| 9 | data bit 7 | data |
| 10 | acknowledge | status |
| 11 | busy | status |
| 12 | paper end | status |
| 13 | select | status |
| 14 | auto feed | control, RAS |
| 15 | fault | status |
| 16 | initialize printer | control |
| 17 | select input | control |
| 18 | ground | |
| 19 | ground | |
| 20 | ground | |
| 21 | ground | |
| 22 | ground | |
| 23 | ground | |
| 24 | ground | |
| 25 | ground | |

As disclosed in the aforementioned parent application, the parallel port controller 14 is preferably capable of interfacing to different types of standard PC parallel ports, e.g., PC-XT, PC-AT, PS/2. In the PC-XT, the data path 28 is typically unidirectional and the status lines 32 are used to transfer data into the standard PC parallel port 20. The PC-AT and PS/2 ports typically permit bidirectional data transfer. The controller 14 is preferably implemented with programmable logic, e.g., a field programmable gate array (FPGA) (not shown) which is loaded by a software device driver executed by the PC 22 to optimize its configuration for the particular parallel port type being used.

The controller 14 preferably supports other parallel port configurations, e.g., an enhanced parallel port or EPP as described in the Mar. 17, 1992 Release 1.7 to the IEEE P1284 Working Group that redefines the use of the pins on a parallel port. According to this standard, a data strobe on pin 14 (formerly auto feed) and a write signal on pin 1 (formerly strobe) are automatically generated by EPP hardware during an output instruction. This state remains until the device connected to the parallel port returns a wait signal on pin 11 (formerly busy). In a similar manner, an input instruction to an EPP automatically generates only a data strobe on pin 14 to signal the device connected to the parallel port to place data on the bidirectional data bus. The device then signals that the data is available with the wait signal on pin 11. By adapting to this standard, embodiments of the present invention can transfer data across the parallel port at rates approaching that possible with a standard internal adapter card.

TABLE 2

Data Modulation

CCITT V.32bis with trellis coding at 14400 bps,
12000 bps, 9600 bps and 7200 bps
CCITT V.32bis at 4800 bps
CCITT V.32 with trellis coding at 9600 bps
CCITT V.32 at 4800 bps
CCITT V.22bis at 2400 bps
CCITT V.22 at 1200 bps
Bell 212A at 1200 bps
Error Control

TABLE 2-continued

CCITT V.42 LAP-M
MNP Class 2, 3, and 4
Data Compression

CCITT V.42bis
MNP Class 5
Fax modulation

Figure 2:
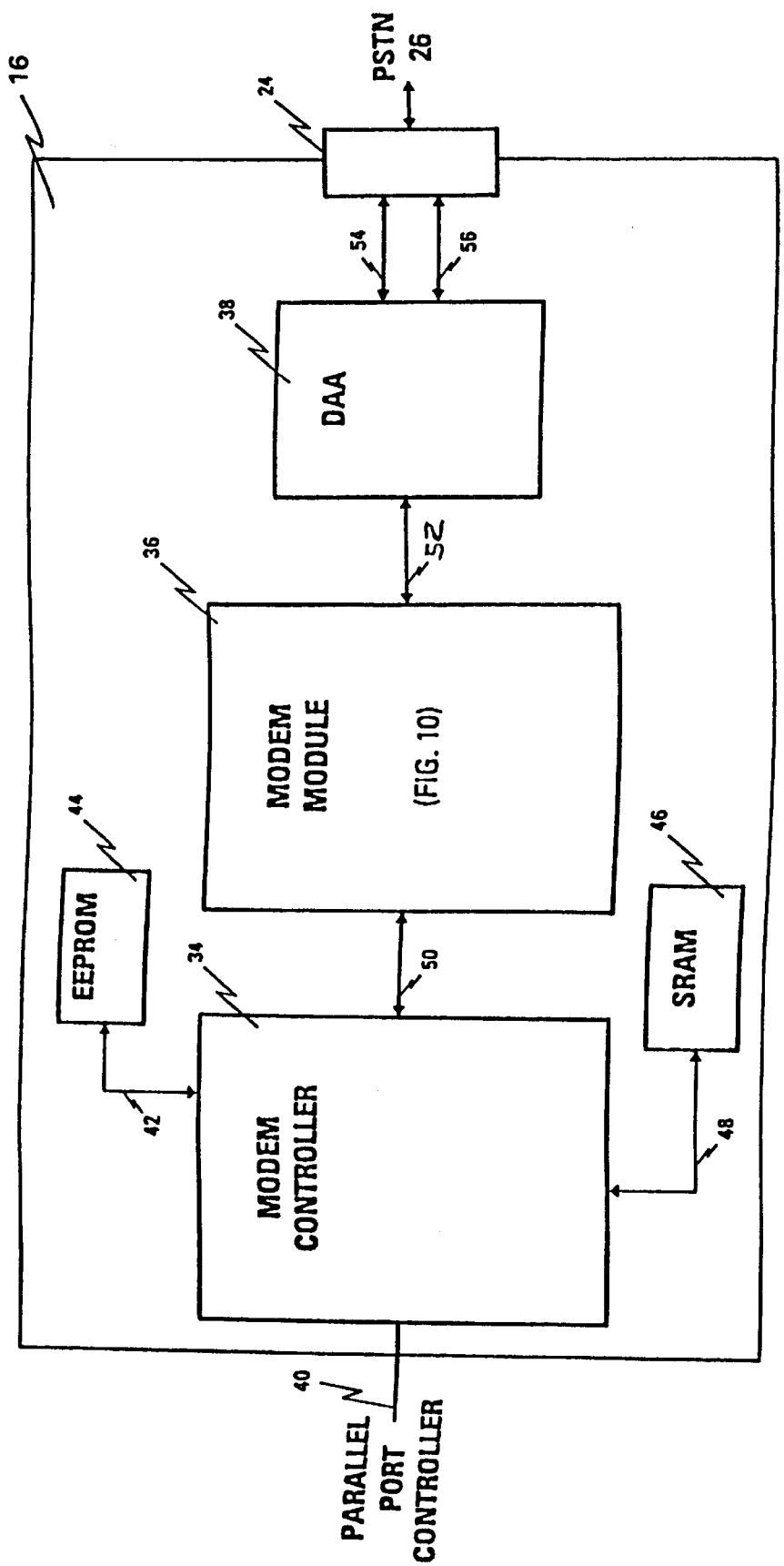
FIG. 2 is a block diagram of a preferred modem and control interface.

Group 3 send/receive fax communication under the
control of Class 1 or Class 2 software, using:
CCITT v.17 at 14400 bps, 12000 bps, 9600 bps,
7200 bps, and 4800 bps
CCITT v.29 at 9600 bps, 7200 bps, and 4800 bps
CCITT V.27ter at 4800 bps and 2400 bps With reference now to FIG. 2, a block diagram of the modem control and interface 16 is shown. The specifications for an exemplary modem and control interface 16 embodiment are shown in Table 2. The modem control and interface 16 is primarily comprised of a modem controller 34, a modem module 36, and a data access arrangement (DAA) 38. Devices which form the modem module 36 are readily available as integrated circuit chips and are sold as modem chip sets by various semiconductor manufacturers. Although functionally similar overall, chip sets by different manufacturers may require different divisions within the modem and control interface 16.

The modem controller 34, an MC68302 in a preferred embodiment, functions to control the transfer of all data between the standard PC parallel port 20 and the PSTN 26 according to standard protocols including the Hayes and Microcom command sets. The modem controller 34 is coupled to the parallel port controller 14, using address/data/control bus 40, which functions as a PC interface for bidirectionally communicating data and commands to the PC 22 via the parallel port controller 14.

TABLE 3

| Register | Address | Host | Modem | Description |
|---|---|---|---|---|
| Host Data | F0 | Write | Read | Data output to modem |
| Host Data | F0 | Read | Write | Data output to host |
| Host Command | F1 | Write | Read | Software Command/Status |
| Modem Command | F1 | Read | Write | Software Command/Status |
| Host Control | F2 | Write | — | Host IRQ output control |
| Modem Control | F2 | — | Write | Modem IRQ output control |
| Host Status | F3 | — | Read | Hardware status |
| Modem Status | F3 | Read | Write | Hardware status |

The parallel port controller 14 contains the registers shown in Table 3 for facilitating the transfer of data between the standard PC parallel port 20 and the modem controller 34. When the PC 22 transfers data to the modem adapter, the PC 22 first loads one of these registers and the modem controller 34 then accesses the data from the controller 14 register. Similarly when the modem controller 34 transfer data to the PC 22, these controller 14 registers are used. To output to one of these registers, the PC must first address the particular desired register. This task is done by placing the address of the register, e.g., F0, on data bits 0–7 and strobing the RAS (register address strobe), the auto feed control in the standard parallel port configuration. Once the register has been selected, a subsequent strobe on the RDS (register data strobe), the strobe in the standard parallel port configuration, will output data bits 0–7 to the selected register. To input from a register, data bit 2 is ORed with the register address when the register is selected. Thus, selecting register F0 for a subsequent read is done using address F4 (F0 OR 4).

The modem controller 34 is bidirectionally coupled via path 42 to a serial EEPROM 44, which stores modem configuration data, and via address/data bus 48 to an SRAM 46, which as a local memory stores modem data and program code. As part of an initialization operation, the SRAM 46 is downloaded with a plurality of executable instructions that the modem controller 34 subsequently executes. More particularly, following the downloading of the parallel port controller FPGA 14, the modem controller, e.g., an MC68302, fetches two initial memory addresses (32-bits each), one byte at a time from a fixed address, e.g., 0, in response to a start signal, e.g., a processor reset. These two initial addresses correspond to a start address which points to the start of a first bootstrap program and a stack pointer. In a preferred embodiment, no local memory is associated with either these initial memory addresses or the first bootstrap program. Instead, the parallel port controller 14 intercepts memory access strobes from the modem controller 34, requests the initial addresses from the PC 22 via the standard PC parallel port 20 and supplies these addresses to the modem controller 34. Then starting at the start address, the parallel port controller 14 fetches instructions from the PC 22, one byte at a time, which are executed by the modem controller 34. The access rate for this first bootstrap program is relatively slow, requiring wait states. To improve the access rate, this first bootstrap program downloads a second bootstrap program into the SRAM 46, preferably at an address range distinct from that used by the first bootstrap program. When the second bootstrap program is completely downloaded, the parallel port controller is configured in response to instructions in the first bootstrap program, e.g., a JUMP or an I/O, to permit the modem controller to begin executing the second bootstrap program from the SRAM 46. The second bootstrap program then downloads a third program, the modem control software, from the PC 22 into the SRAM 46 and transfers control to the modem control software within another portion of the SRAM 46 via a JUMP instruction. Thus, all of the modem control software is initially stored on the PC 22, normally on a hard or floppy disk, and transferred to the modem controller 34 without requiring any resident non-volatile, unalterable memory, e.g., ROM. Consequently, any enhancements or modifications to the modem control software do not require alterations to hardware that embodies a modem adapter of the present invention.

In order to better understand the above described bootstrapping method, a preferred embodiment comprises the following steps: (1) Initialize the modem controller 34 to begin fetching instructions and data, which correspond to a first bootstrap program, from the PC 22 via the standard PC parallel port 20; (2) Load, under control of the first bootstrap program, the data received from the PC 22, which correspond to a second bootstrap program, into the SRAM 46 used as local memory, (3) Execute the second bootstrap program with the modem controller 34 to receive data from the PC 22, (4) Load, under control of the second bootstrap program, the data received from the PC 22 corresponding to a third program, the modem control software, into the local memory, and (5) Execute the modem control software with the modem controller 34.

While an SRAM is used in a preferred embodiment, other types of volatile memory, e.g., DRAM, are also within the scope of the described bootstrap method. Additionally, other types of nonvolatile, but alterable, i.e., read/write, memory devices, generically referred to as NVRAM, are useful in conjunction with the described bootstrap method. Such devices may be periodically reloaded whenever a new version of software is available. Typical types of nonvolatile but alterable memory devices include Flash, EEPROM, battery backed-up RAM and CORE as well as any other functionally compatible devices, i.e., devices which maintain memory when power is removed but are otherwise alterable under program control. It is further recognized that a memory system containing portions of memory comprised of volatile devices and other portions comprised of non-volatile but alterable devices is useful with the described bootstrap method when the non-volatile devices are downloaded with software or configuration data.

In a preferred embodiment described above, the modem controller program execution takes place across the standard PC parallel port. However, various interfaces can be used in place of the standard PC parallel port for practicing the present invention. For example, downloading of data using the aforementioned bootstrap method via a standard serial port, via an I/O port, or via a shared memory are also within the scope of the present invention.

Although a modem adapter has been described as a preferred embodiment, the scope of the present invention includes other types of adapters can profitably use the described bootstrap method for downloading executable instructions to either volatile or nonvolatile memories. For example a LAN/modem adapter is further described below. By using the described bootstrap method, adapters, e.g., tape controllers, SCSI controllers, Ethernet adapters, pagers, communication equipment, test equipment, LAN adapters, etc., can be reconfigured with new operating software as dictated by the application.

The modem module 36, an AT&T V.32 Data Pump chip set in a preferred embodiment, is bidirectionally coupled to the modem controller 34 using digital signal path 50 as well as to the DAA 38, using preconditioned analog signal path 52. The DAA 38 is coupled using ring path 54 and tip path 56 to an RJ-11 connector 24 which is coupled to the PSTN 26. The DAA 38 preconditions signals to and from the PSTN 26 as well as providing signal protection, required when connecting to various PSTNs, to form preconditioned analog signals on path 52. The preconditioned analog signals are bidirectionally input to the modem module 36 which converts these analog signals into digital form on digital signal path 50 for protocol processing by the modem controller 34.

Digital signal path 50 consists of two interfaces that the modem controller 34 uses to communicate with the modem module 36. The first interface communicates in parallel to the modem controller 34 eight bits at time. In a preferred embodiment, the modem controller 34 uses the parallel interface to control and interrogate the status of the modem module 36. The second interface is a serial interface. The serial interface is comprised of a first full duplex USART (universal synchronous/asynchronous receive/transmitter) integrally located with the modem controller 34 and a second full duplex USART within the modem module 36. The serial interface is used to exchange data that is received from or transmitted to the public switched telephone network (PSTN) 26.

Figure 10A:
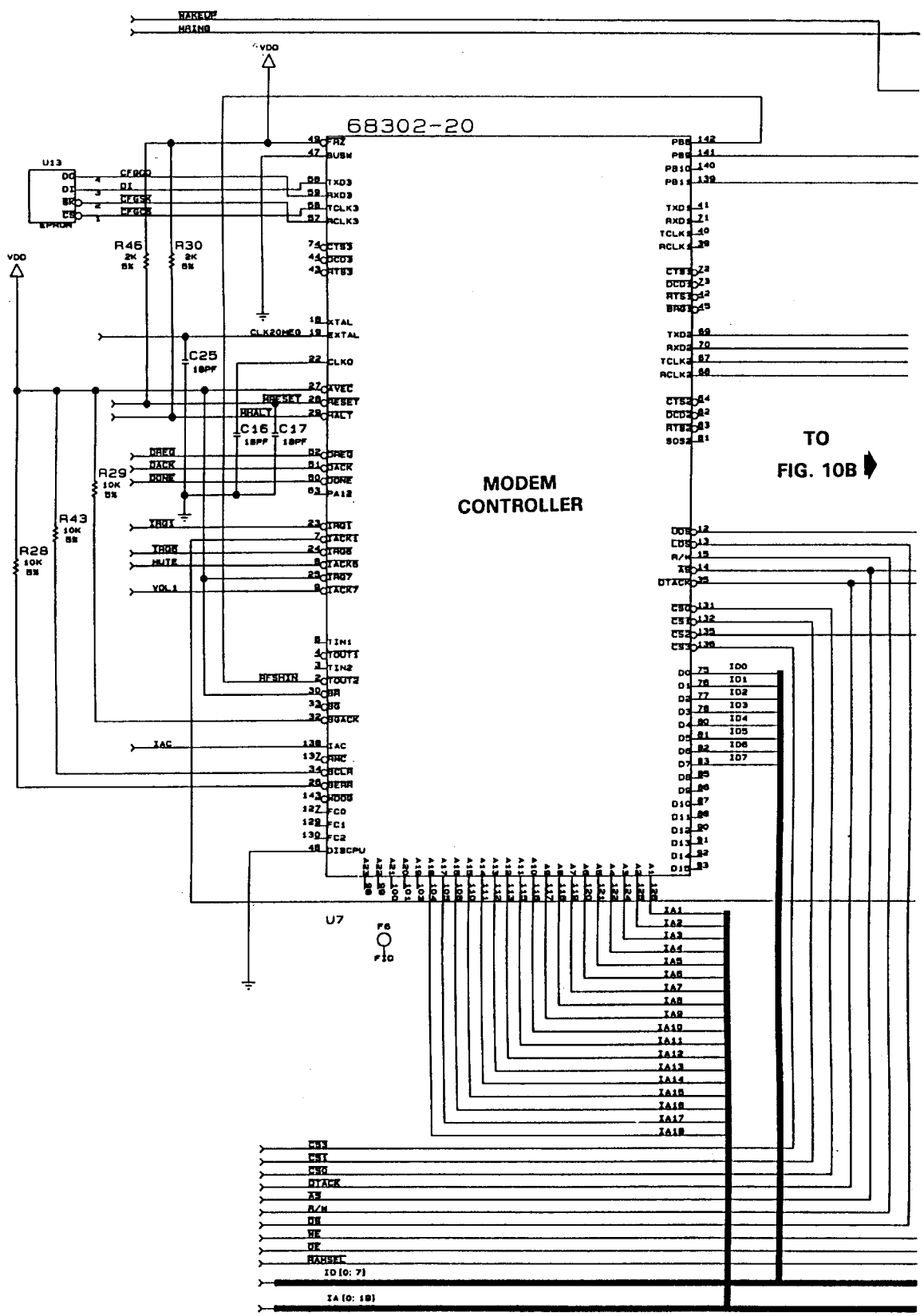
FIG. 10 is a top level schematic diagram of the modem controller and modem module in a preferred embodiment.
Figure 10B:
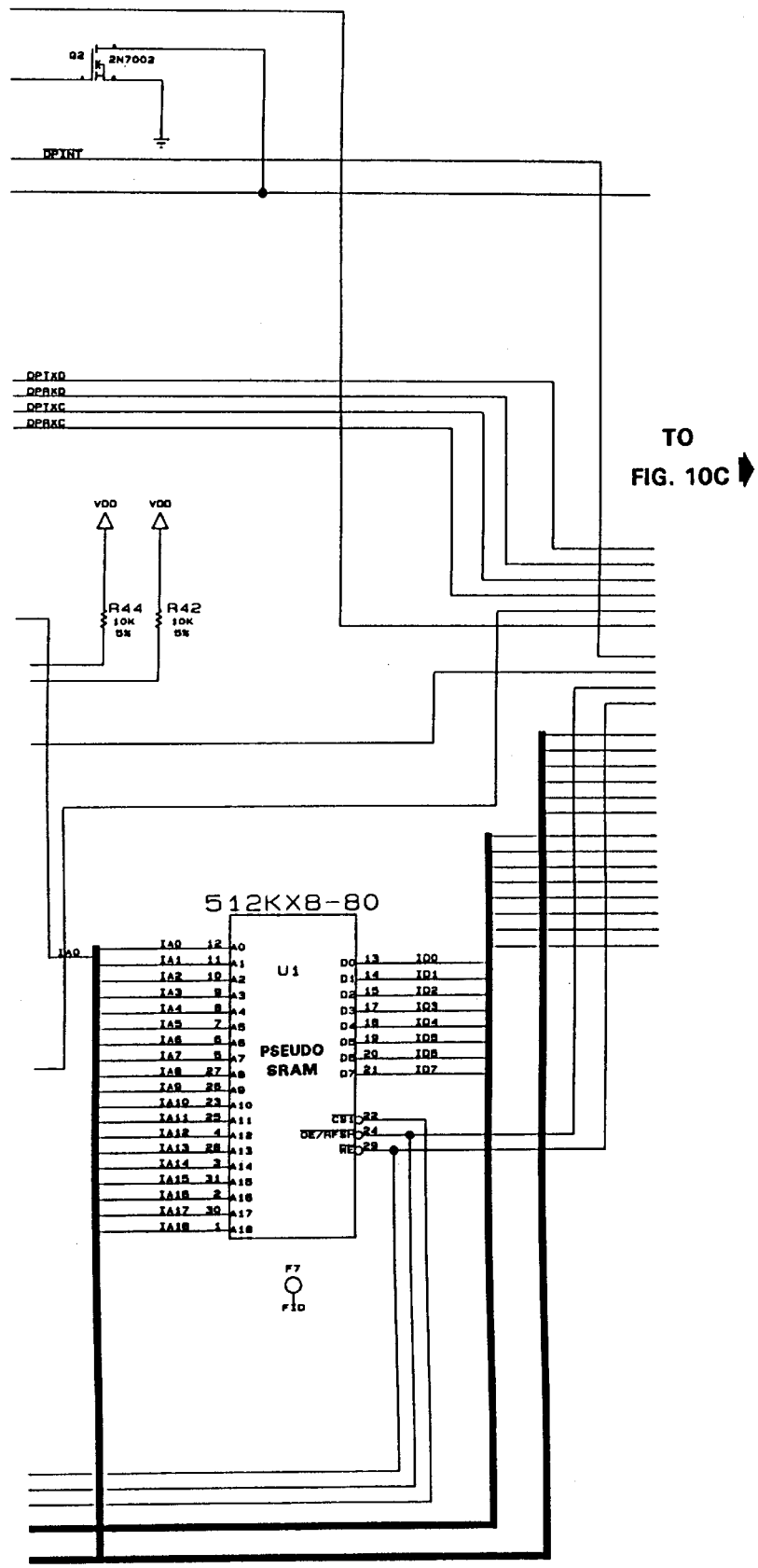
Figure 10C:
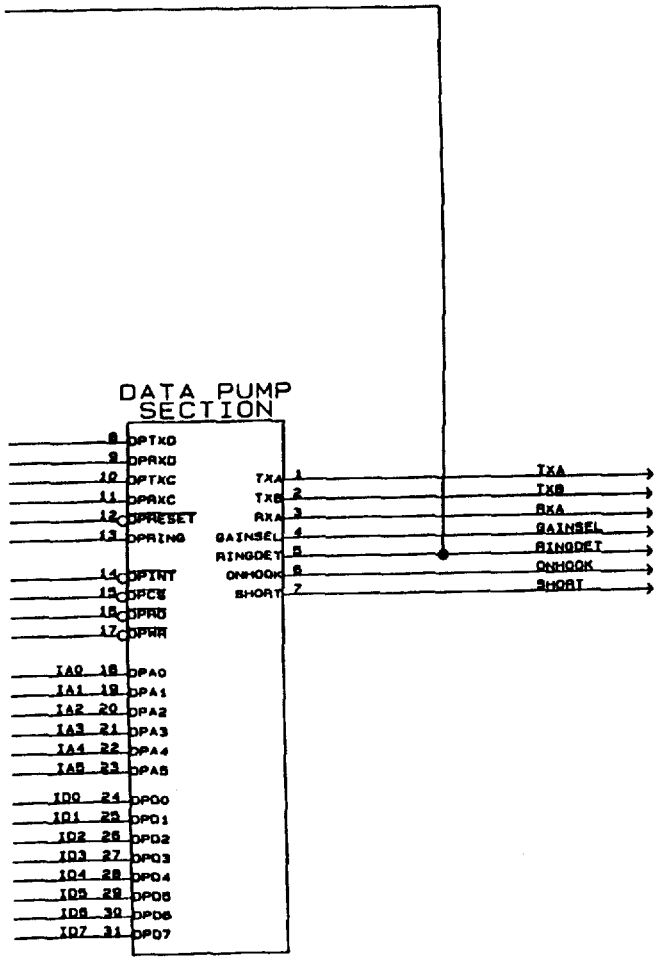
Figure 11A:
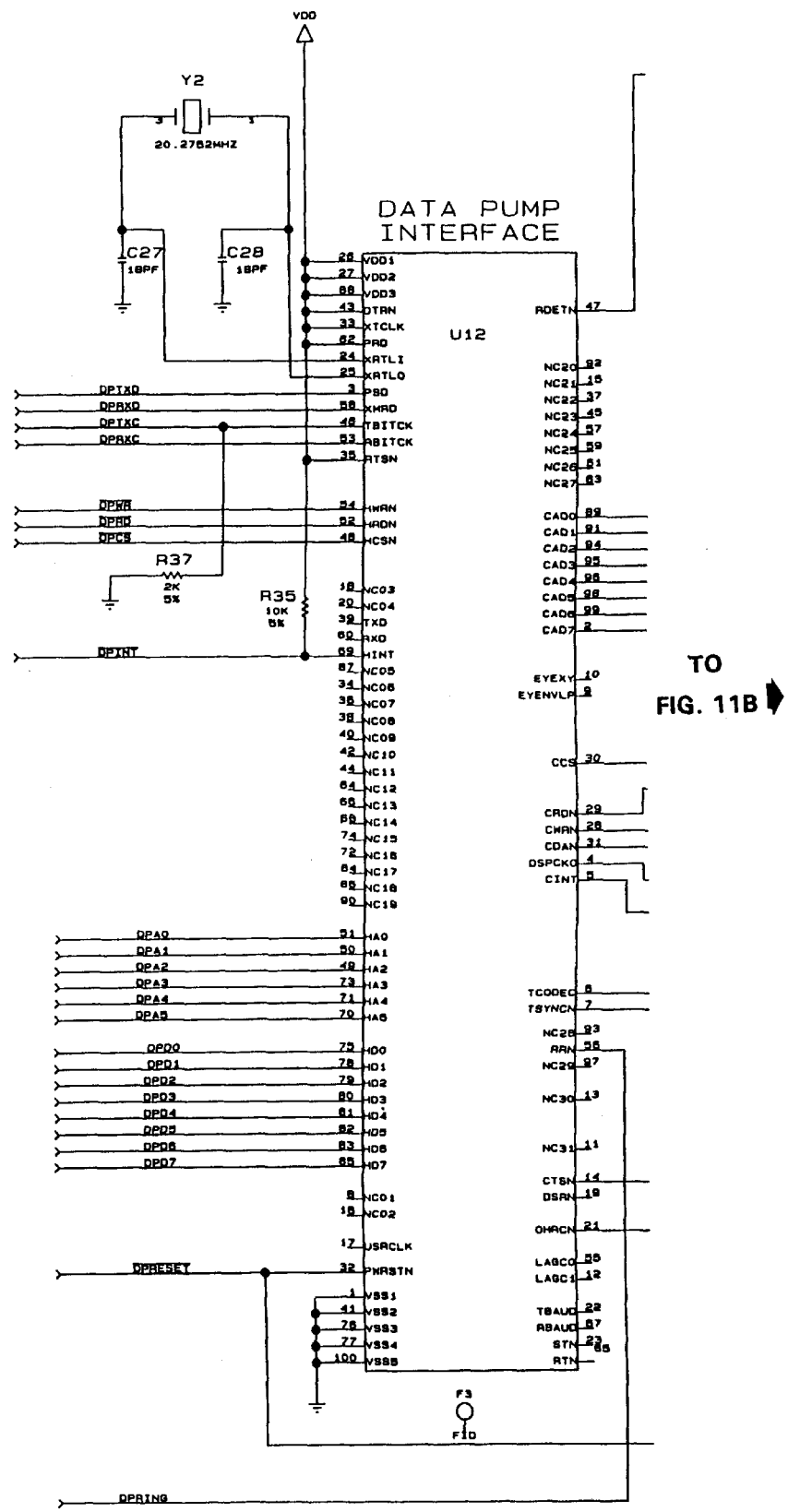
FIG. 11 is a detailed schematic diagram of a preferred modem module implemented by an AT&T V.32 data pump chip set.
Figure 11B:
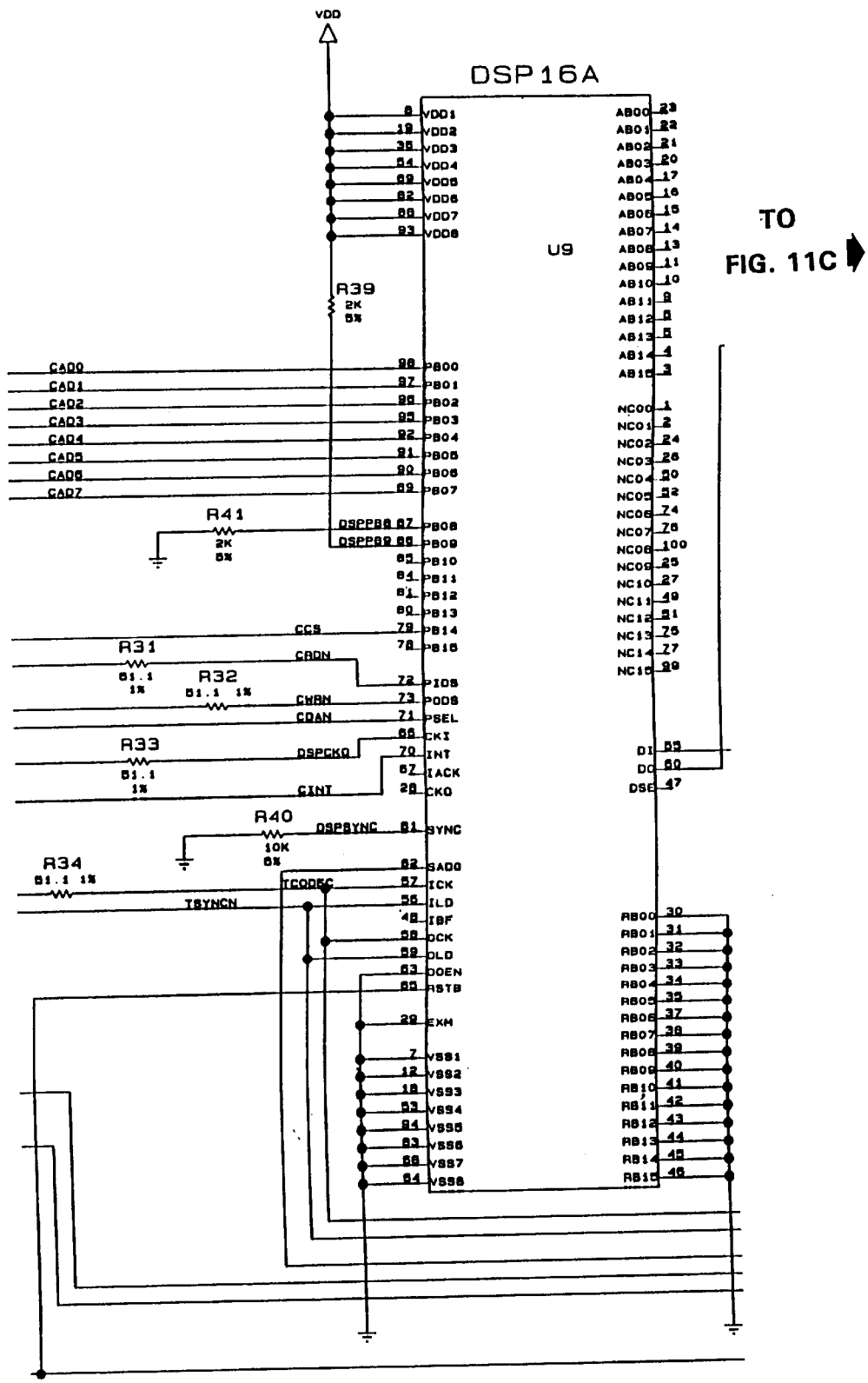
Figure 11C:
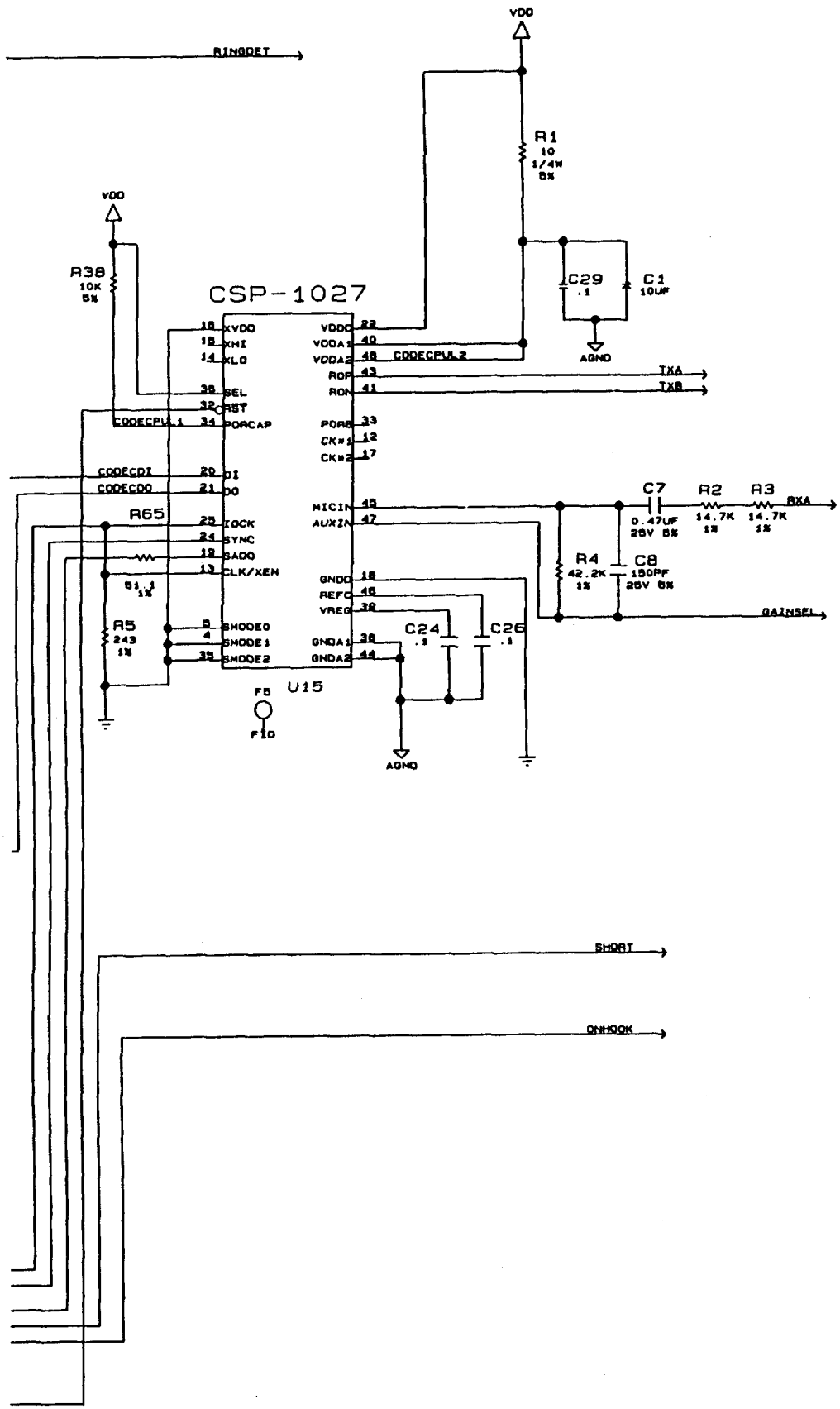
Figure 12A:
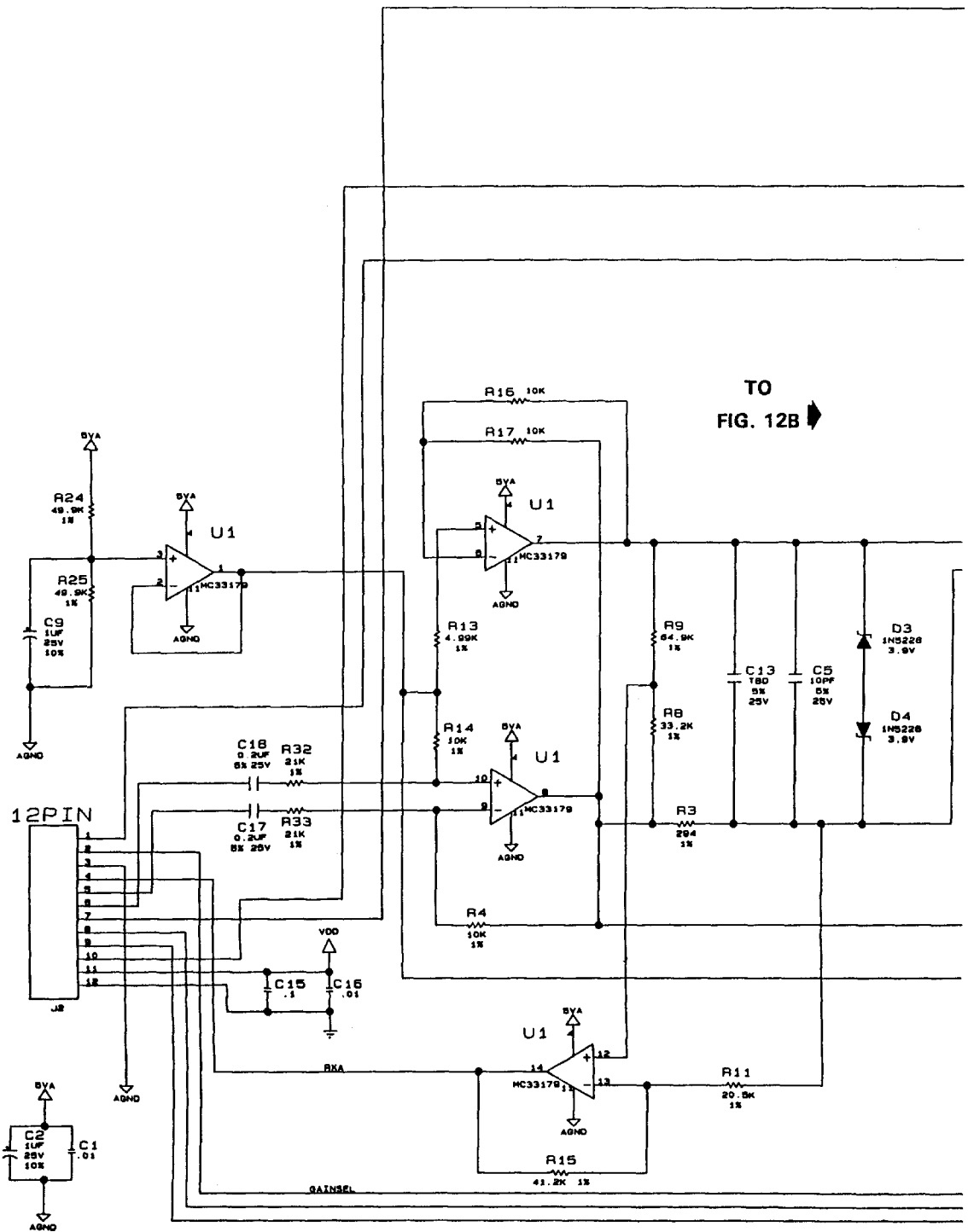
FIG. 12 is a schematic diagram of a preferred data access arrangement (DAA)
Figure 12B:
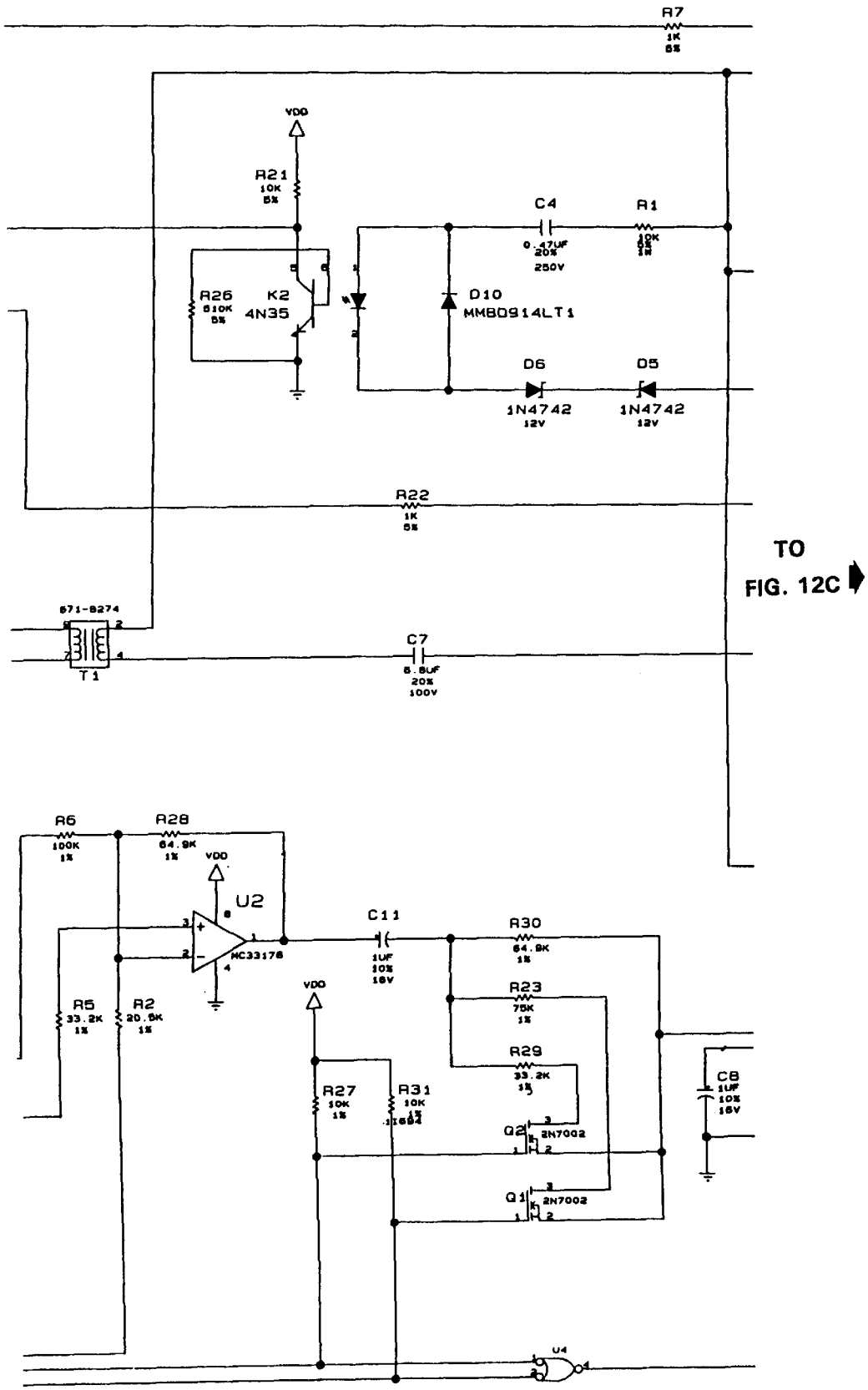
Figure 12C:
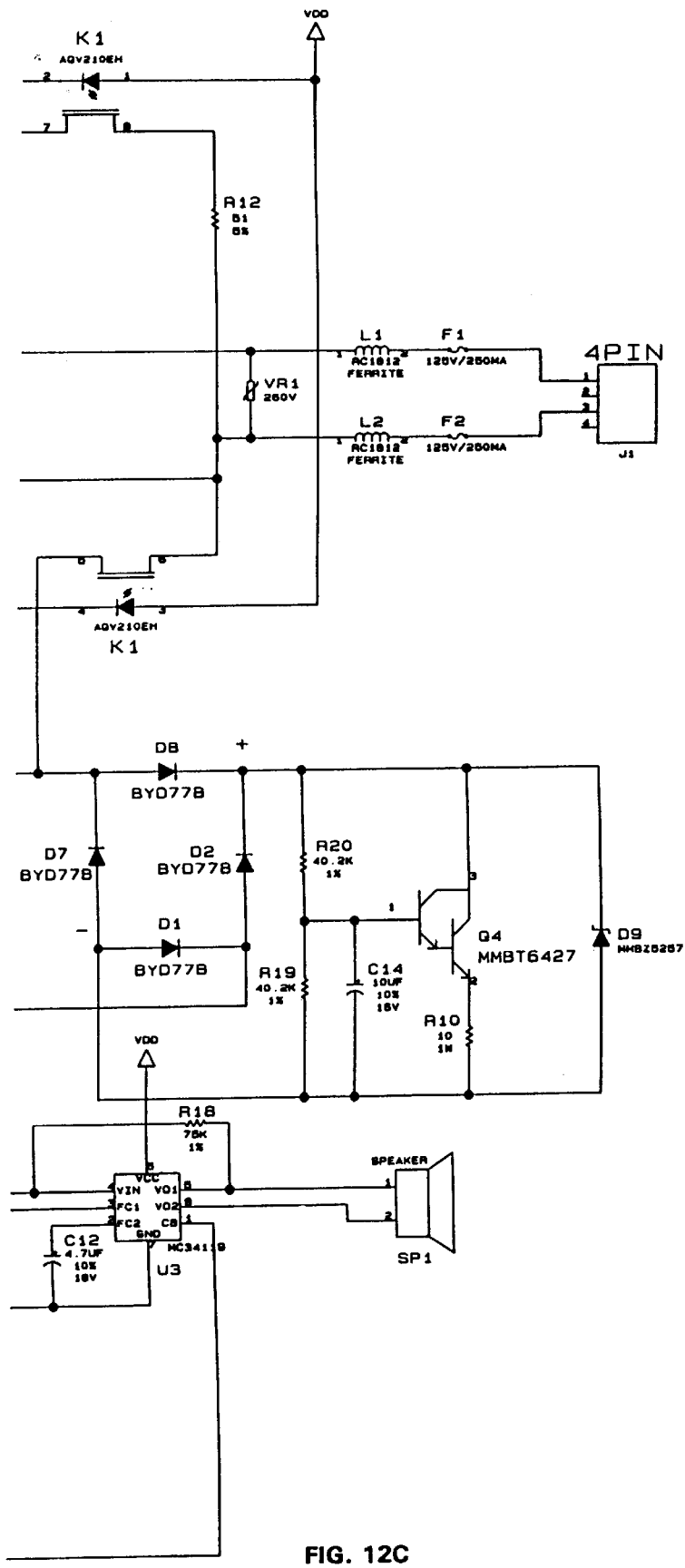

With reference now to FIGS. 10–12, there are shown schematic diagrams of a preferred embodiment of the present invention. In FIG. 10, a top level schematic diagram showing the interface between a 68302 microprocessor, the modem controller 34, and a data pump section which is the modem module 36 for a preferred embodiment. In FIG. 11, a detailed schematic diagram of the data pump section/ modem module is shown. In this embodiment, the modem module 36 is formed with an AT&T V.32 chip set. This chip set is comprised of a data pump interface, a digital signal processor (DSP) and a codec. This chip set is coupled to a DAA 38, as found in FIG. 12.

The three components of the data pump chip section together perform the function of turning the binary data into an analog signal that can be transmitted on the PSTN. The data pump interface functions to connect the DSP to the modem controller 50. This involves adapting signal timing and bus isolation for each of the two smart devices. The DSP is the digital signal processor that actually perform mathematical manipulations of data such that it is in a format that is compatible with an a analog PSTN line. The codec does digital to analog and analog to conversions of modulated data as well as signal amplification and echo cancelling allowing the received signal to be interpreted separately while on the same line as the transmitted signal.

With reference now to FIGS. 3, 4 and 5A–5D, there is shown a block diagram and flow charts of software referred to as redirector software 58. The redirector software's function is to permit the use of existing modem control software to transparently work with the modem adapter 10 of the present invention. Existing modem control software, e.g., CROSSTALK, PROCOMM, MIRROR, etc., presume the existence of a serial I/O chip, 8250 or equivalent, as a communication port at a specified I/O location. The serial I/O chip, referred to as a UART or universal asynchronous receiver transmitter, or a USART is the interface between the PC and a modem or serial RS-232 link. These communication I/O ports in a PC are referred to as COM1, COM2, COM3 and COM4 where the first two ports are located at default address blocks beginning at 0x3F8 and 0x2F8, respectively. However, in the present invention, the modem adapter 10 is instead interfaced to the standard PC parallel port 20 on the PC 22 at a specified, but different, I/O location. These standard PC parallel ports are referred to as LPT1, LPT2 and LPT3 where the first two ports are typically located at default address blocks starting at 0x378 and 0x278, respectively. While the designation of the I/O port address is normally alterable from a menu selection in the modem control software, the I/O protocol for interfacing to a serial I/O port, which is normally dedicated to interface to a modem or other serial interface, and a standard PC parallel port, which is normally dedicated to interface to a Centronics compatible printer, differ significantly. Thus, the redirector software 58 intercepts serial I/O port commands and instead outputs reformatted parallel port commands to the modem adapter 10 to permit the transparent use of the existing modem control software. Due to the mode of operation for the microprocessor required by the redirector software 58, this task cannot be accomplished on all compatible PCs but instead can only be accomplished on PCs with a 386 or later generation processor as its microprocessor controller. Thus, the 386, 486, Pentium, future compatible processors and equivalents support the use of the redirector software 58 while PCs based upon the 86, 186 and 286 or equivalent microprocessors cannot be supported.

Figure 3:
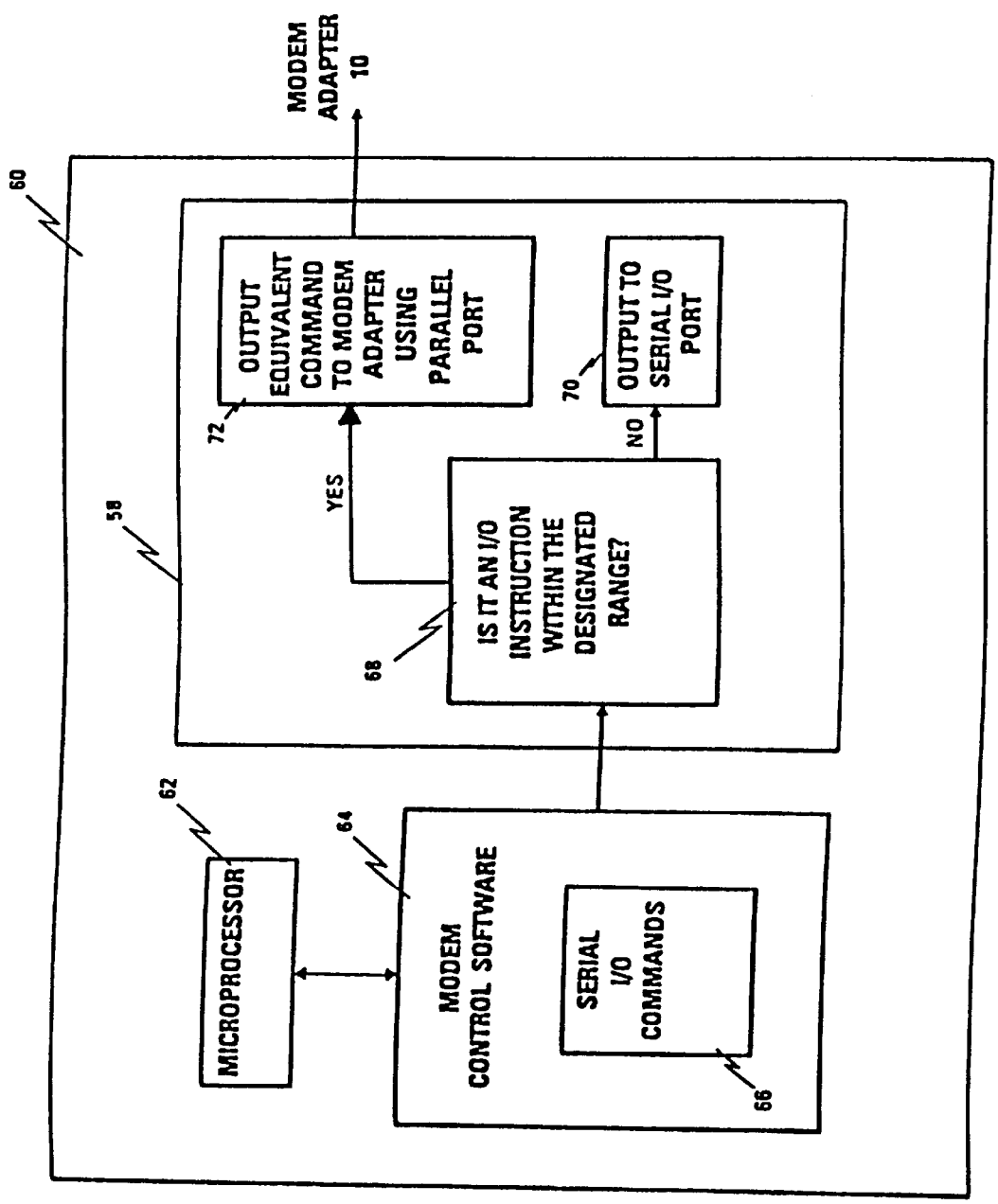
FIG. 3 is a block diagram depicting the interface of the redirector software with an IBM-compatible PC.
Figure 4:
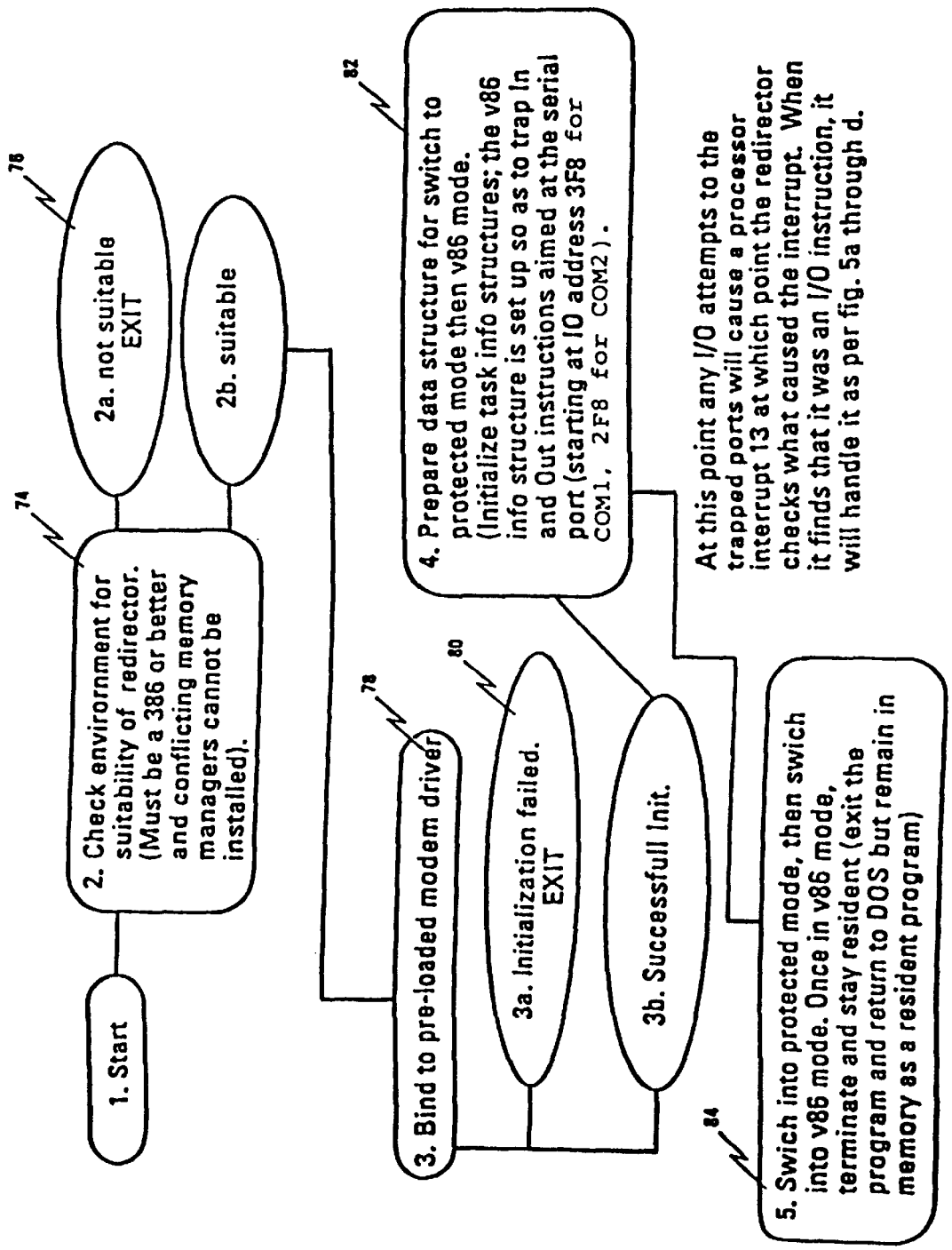
FIG. 4 is a flow chart depicting the initialization routine executed by the redirector software for interfacing existing modem control software with the modem adapter.

With specific reference to FIG. 3, a block diagram is shown of the redirector software 58. An IBM PC or equivalent microcomputer 60 under control of a microprocessor 62, executes software packages 64 that are normally launched and at least partially under control of the MS-DOS operating system. When the software package 64 is modem control software, the software package 64 will contain software instructions 66 that either directly output I/O commands to a designated 8250 serial I/O port or alternatively rely upon resident software routines from the BIOS (not shown), a ROM within the PC, that instead contains the I/O commands to be intercepted. From the standpoint of the redirector software 58, the actual source of the serial I/O instruction is irrelevant. The redirector software 58, as described below, determines if an I/O instruction references an I/O port within a designated range, as shown in Block 68. If the I/O instruction is outside of the designated range, the redirector software 58 passes the I/O instruction, as shown in Block 70. However, if an I/O instruction for the designated UART is detected, the redirector software 58 will reformat the instruction into an equivalent form for the modem adapter 10 and instead output this command to the designated standard PC parallel port 20, as shown in Block 72. It should be apparent from this description to one of ordinary skill in the art that since instructions to the designated UART are never permitted to occur, the existence of this UART is insignificant, thus a virtual or otherwise non-existent UART and associated I/O address can be referenced by the modem control software. Although modem control software can be made that directly supports the parallel port interface to a modem that is found in embodiments of the present invention, the vast majority of existing software only a conventional serial port interface. While software that directly supports the parallel port interface inherently is more efficient due to the reduced software overhead, the use of the redirector software 58 permits the use of extensive libraries of existing modem control software.

With reference now to FIGS. 4 and 5A–5C, a more detailed flow chart for the operation of the redirector software 58 is shown. Upon initialization of the PC 60, a modem driver is initially loaded which configures the modem adapter 10 of the present invention as previously described by first downloading configuration data for the parallel port controller 14 and then presenting executable code to the modem controller 34 that is executed to download the remaining modem control software. Additionally in an alternative embodiment, a driver is installed for a LAN interface. Next, the redirector software 58 is similarly executed. Initially, the redirector software 58 in Block 74 must confirm that a proper environment is available for the redirector software 58, that being the existence of a microprocessor that is a 386 or later generation of the 80×86 family of microprocessors and that a conflicting memory manager is not present. Thus, the use of an XT (86) or a 286 type AT PC will result in a failure. In these cases, the redirector software 58 will exit to Block 76 and will not be installed. The initialization sequence continues with Block 78, which binds to the preloaded modem driver and LAN driver, when present. The binding process makes routines for interfacing to the modem control and interface 16 and, when present, LAN control and interface accessible to the redirector software 58. A failure of this initialization is noted at Block 80.

Data structures are then initialized in Block 82, for switching the 386 or later generation 80x86 microprocessor into protected mode and then into virtual or v86 mode where designated ranges of I/O instructions which refer to the designated serial I/O port can be trapped. In the case of COM1, the default range of I/O instructions is from 0x3F8-0x3FF, while in the case of COM2 the default range of I/O instructions is from 0x2F8-0x2FF. However, the redirector software 58 may be configured to work with other than the default I/O ranges. Specifically, an I/O permission bitmap is generated for the current task segment to identify the I/O instructions to be trapped. The microprocessor 62 is then switched in Block 84 into protected mode and then into v86 mode. Once the initialization process is completed, the redirector software 58 terminates but remains resident in memory, returning control to MS-DOS which will now be running in v86 mode rather than real mode. Consequentially, all I/O instruction to the designated address ranges will be trapped and redirected to the modem adapter 10.

Once the redirector software 58 has been configured, the initialized hardware in the microprocessor 62, running in v86 mode, will trap any I/O instructions within the designated range and cause an interrupt, specifically to interrupt 13, as defined by the 80x86 microprocessor's hardware. This interrupt is directed toward a redirector interrupt routine which is now resident in memory.

With reference now to FIG. 5A–5D, typical examples of the processing of the redirection software 58 are given. In FIG. 5A, an OUT instruction within the specified I/O range is intercepted by the microprocessor 62. The microprocessor 62 then generates an interrupt to the redirector software 58. The redirector software 58 identifies this type of output command as a send data command and subsequently reformats this command into a parallel port compatible send data command for the modem adapter 10. The reformatted command is then sent to the designated standard PC parallel port. Similarly, as shown in FIG. 5B, the redirector software 58 intercepts an IN instruction that is used to receive data from the USART. However in this case, data may have been previously received and stored in a FIFO buffer, present in the redirector software 58. In this case the redirector software 58 simply returns the stored data. Thus, the throughput of the system may be improved due to this expanded capacity from the FIFO. In FIG. 5C, an IN instruction is instead identified as a request for status from the USART. Since the actual hardware associated with the modem of the present invention differs significantly from a UART-modem combination as found in the prior art, the redirector software 58 will reformat the status data into a form compatible with the UART status of the prior art, thus achieving transparent operation while interfacing to the modem adapter 10 of the present invention. In FIG. 5D, an OUT instruction directed to the USART control port is intercepted by the redirector software 58 and translated into a command to the modem control and interface 16. Included in Appendix A of the parent application which is incorporated by reference is a software listing of the redirector software 58 configured for operation with MS-DOS 6.0, illustrating the features that have been described.

Figure 6:
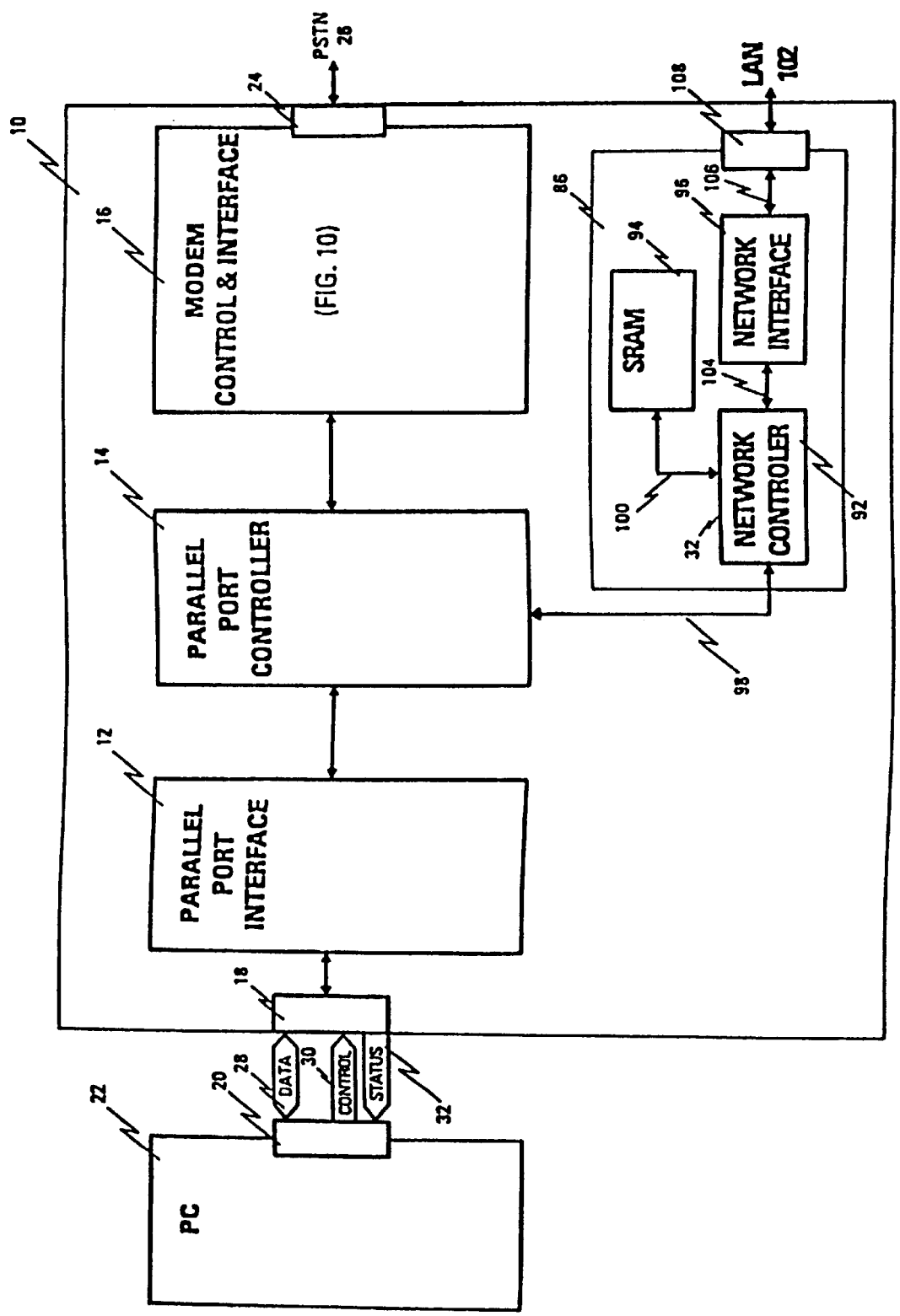
FIG. 6 comprises a functional block diagram of a preferred LAN/modem adapter in accordance with the present invention.

With reference now to FIG. 6, there is shown an alternate preferred embodiment of the present invention. In this embodiment, a LAN control and interface 86 is additionally included within the modem adapter to form a LAN/modem adapter 10. The interface of a LAN or network adapter to a standard PC parallel port has already been disclosed in a commonly assigned patent. Additionally, selection logic is included within the parallel port controller 14 to alternatively interface to either the modem control and interface 16 or the LAN control and interface 86, thus sharing the standard PC parallel port 20. As previously discussed, the PC 22 communicates with the modem control and interface via registers located within the parallel port controller at addresses within the range of F0 to F3 (ORed with 04 for data reads). In a similar manner the LAN control and interface 86 is instead addressed when the most significant nibble of the address is not an F, e.g., the most significant nibble equals 0–E. Similarly, a single data bit is used to distinguish reads and writes to registers associated with the LAN control and interface 86. In a preferred embodiment, the read/write determination is done within the LAN control and interface 86 using data bit 6. Thus, addresses of 00 to 0F output to registers and addresses of 40 to 4F input from registers used by the LAN control and interface 86.

Figure 7:
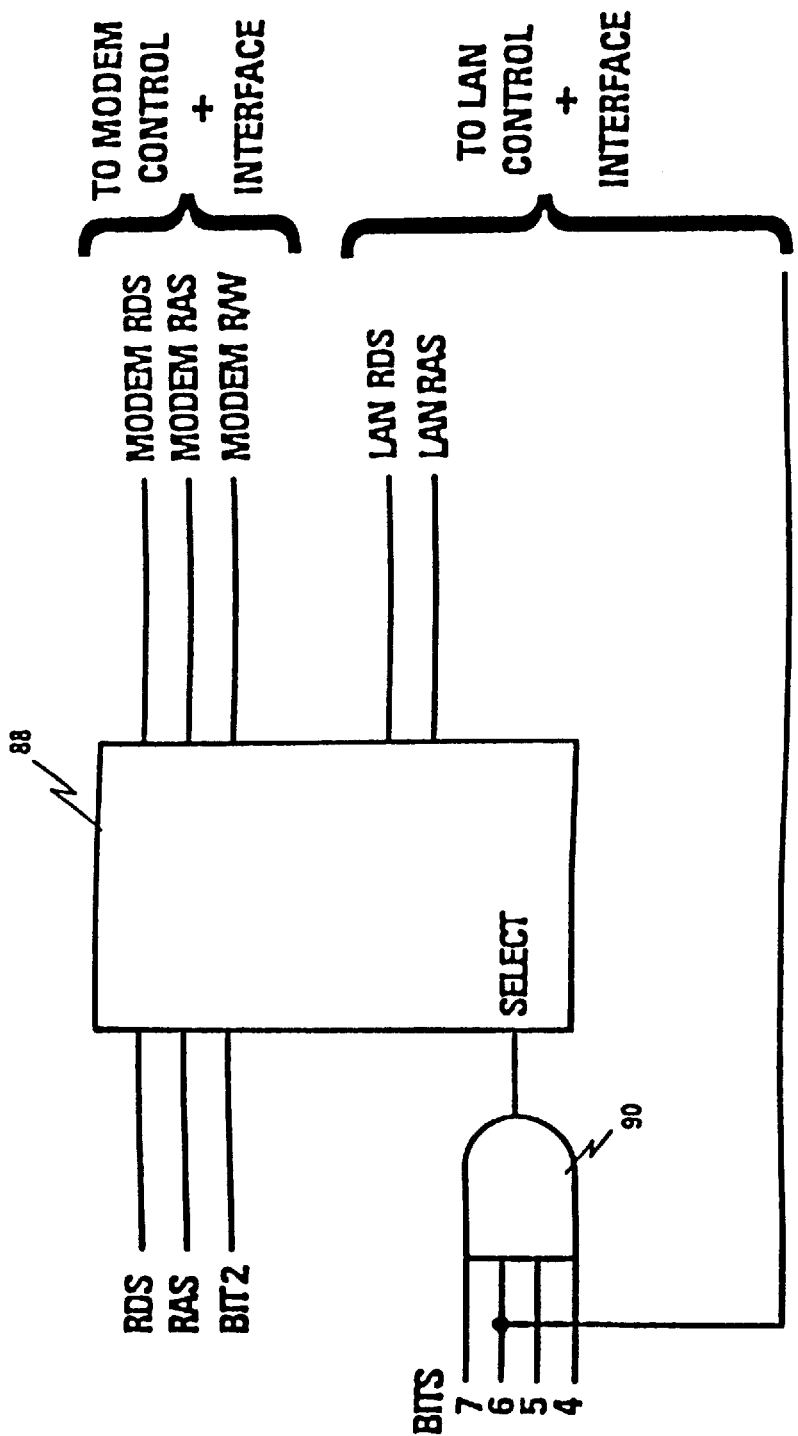
FIG. 7 is a block diagram of the parallel port selection logic of a preferred embodiment.
Figure 8A:
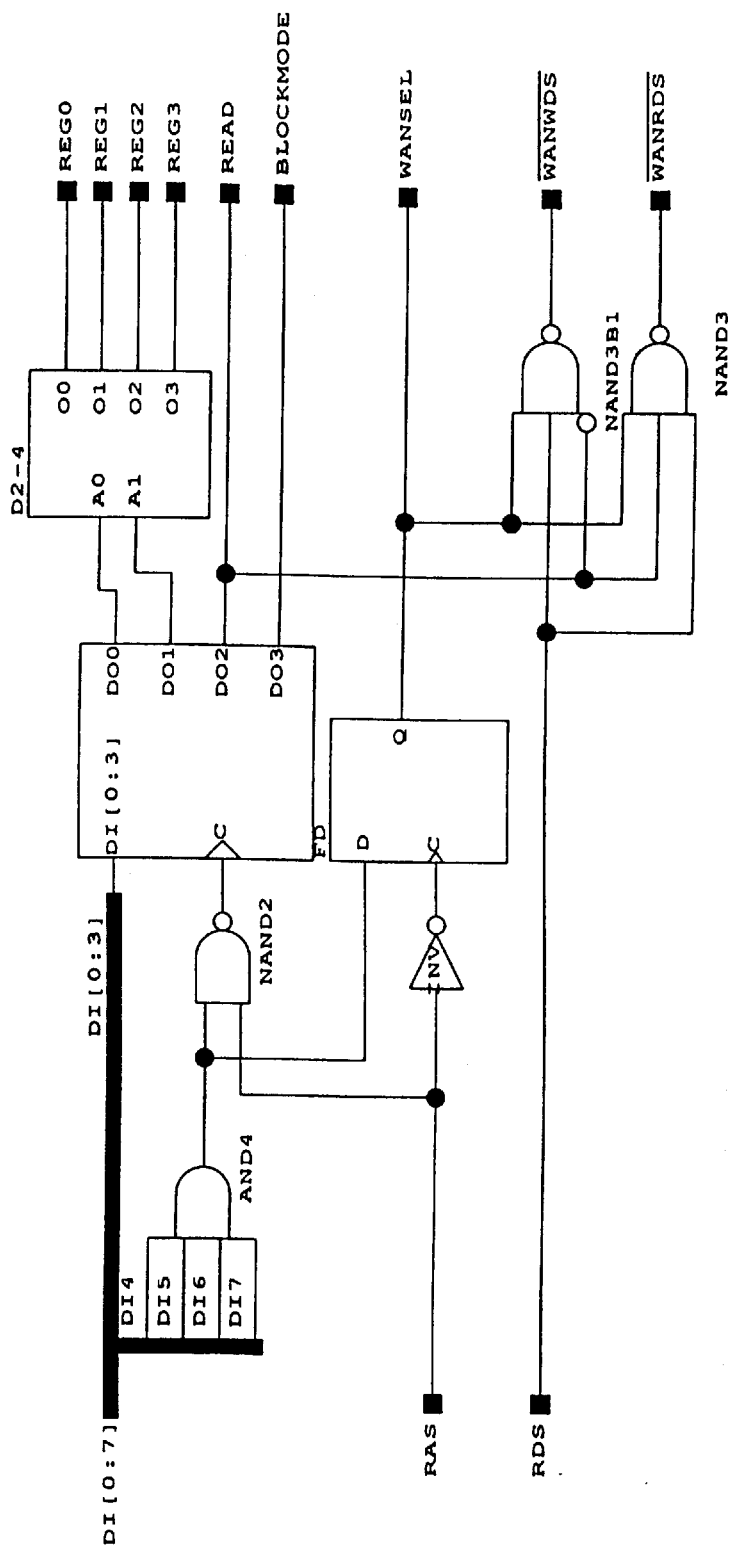
FIGS. 8A–8I are schematic diagrams of the parallel port controller logic which can be implemented on a field programmable gate array (FPGA) for interfacing the standard PC parallel port to the modem control and interface.
Figure 8B:
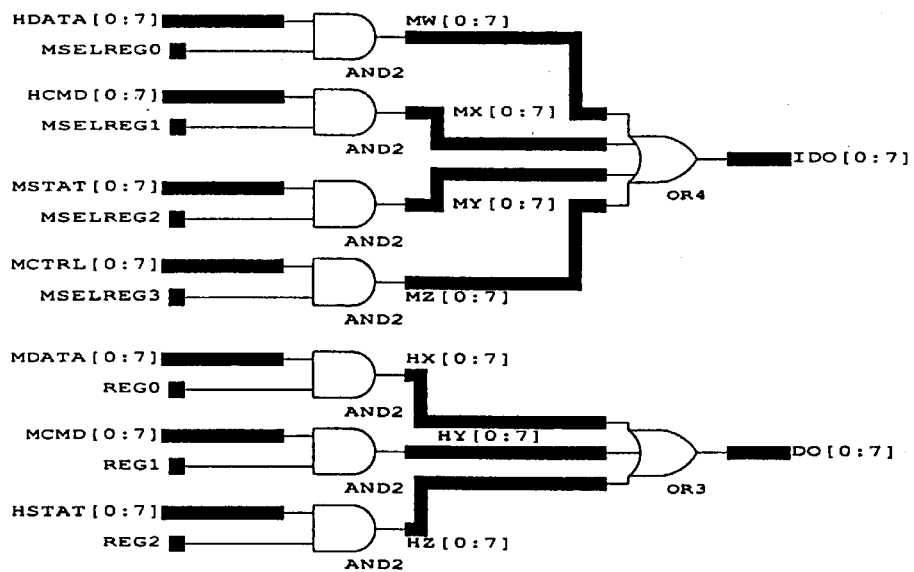
Figure 8C:
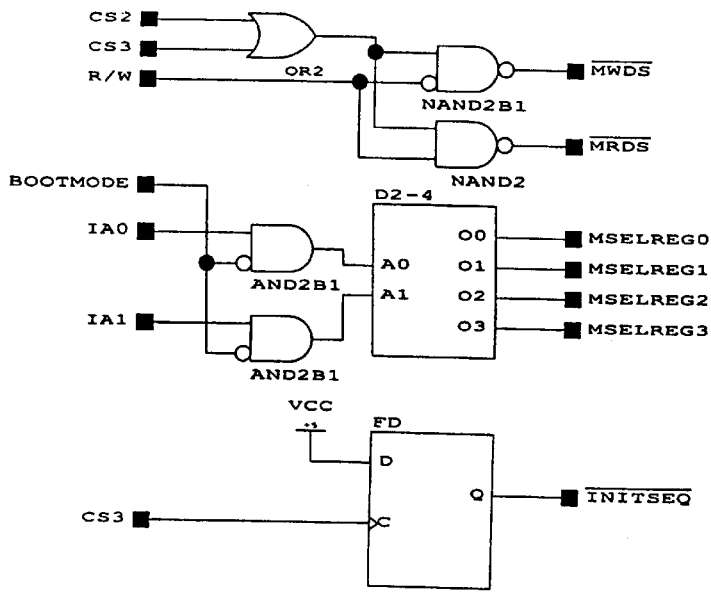
Figure 8D:
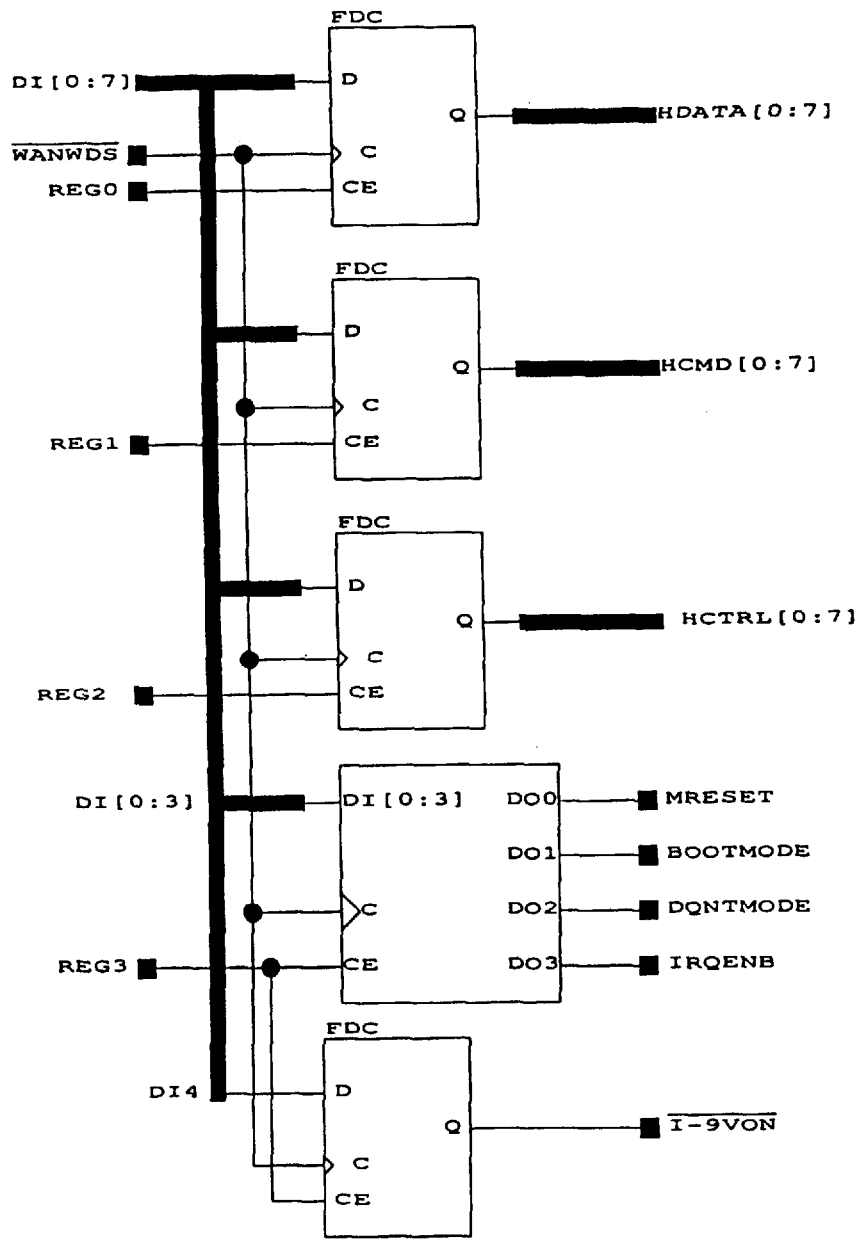
Figure 8E:
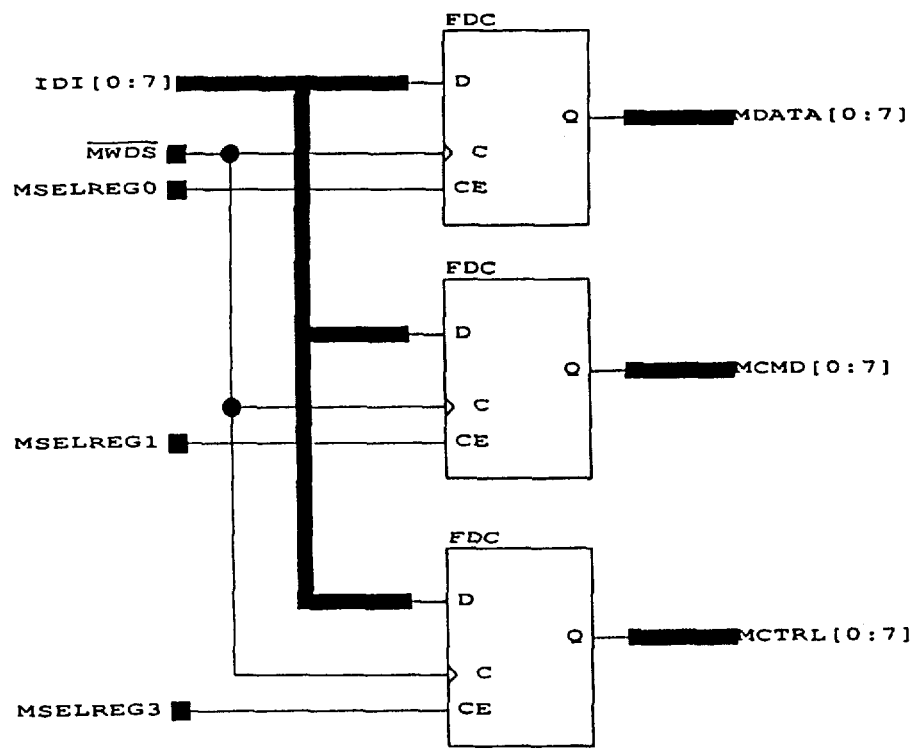
Figure 8F:
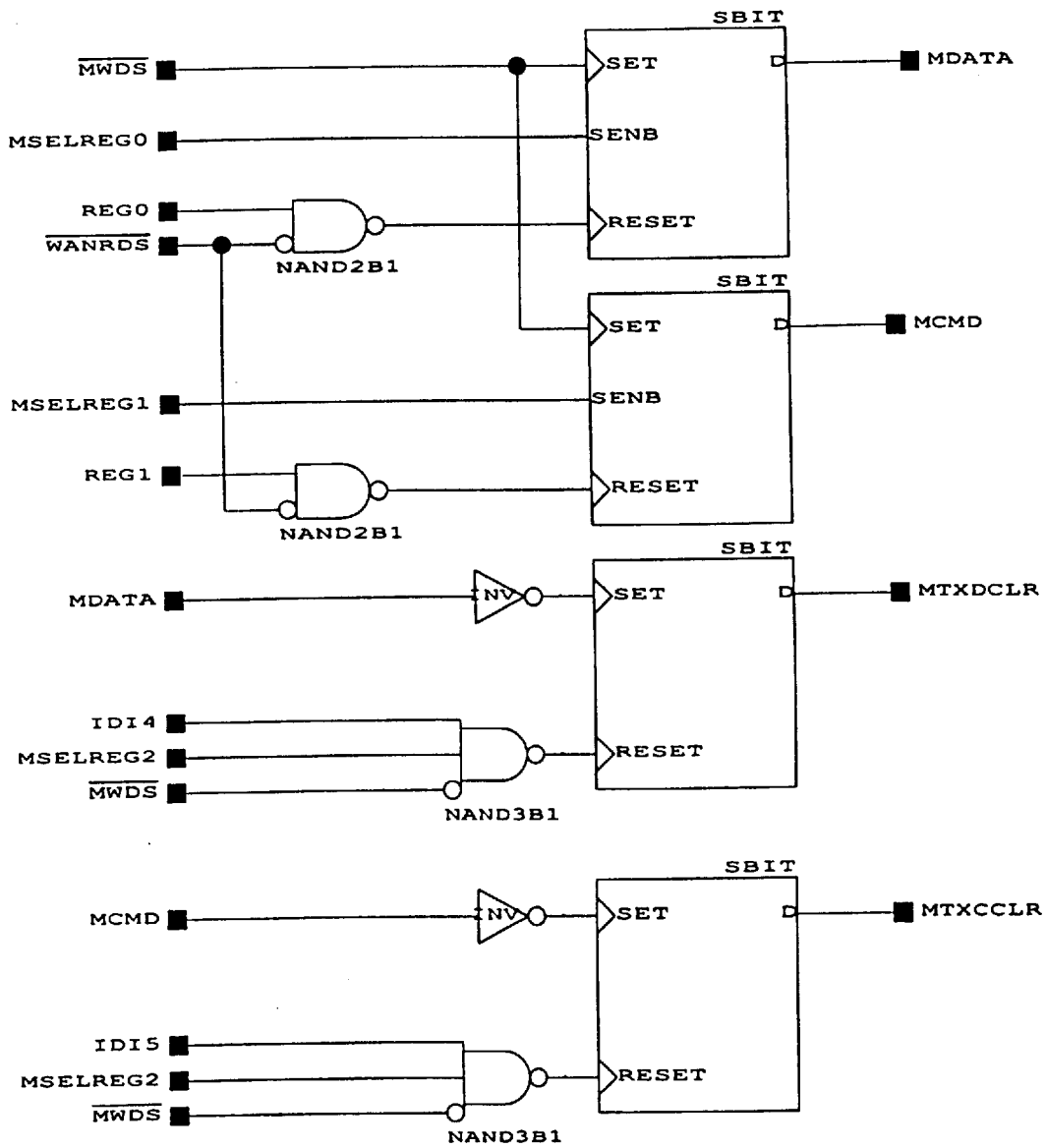
Figure 8G:
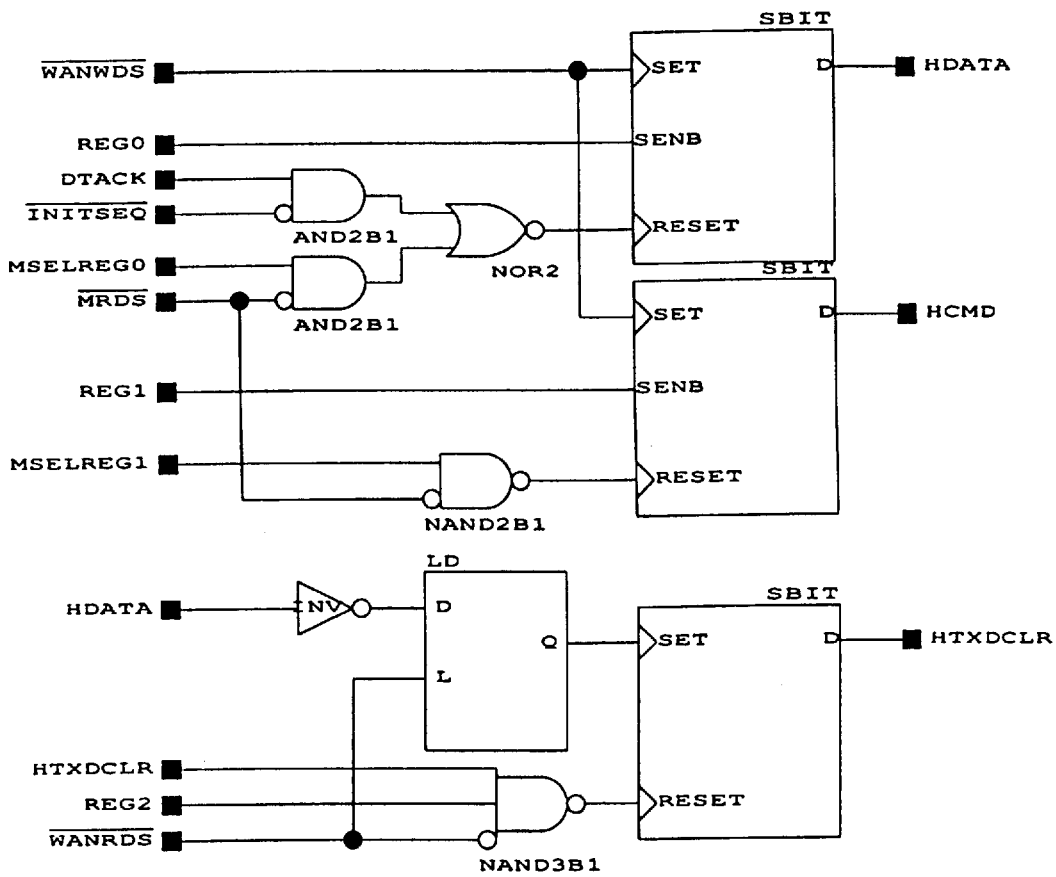
Figure 8H:
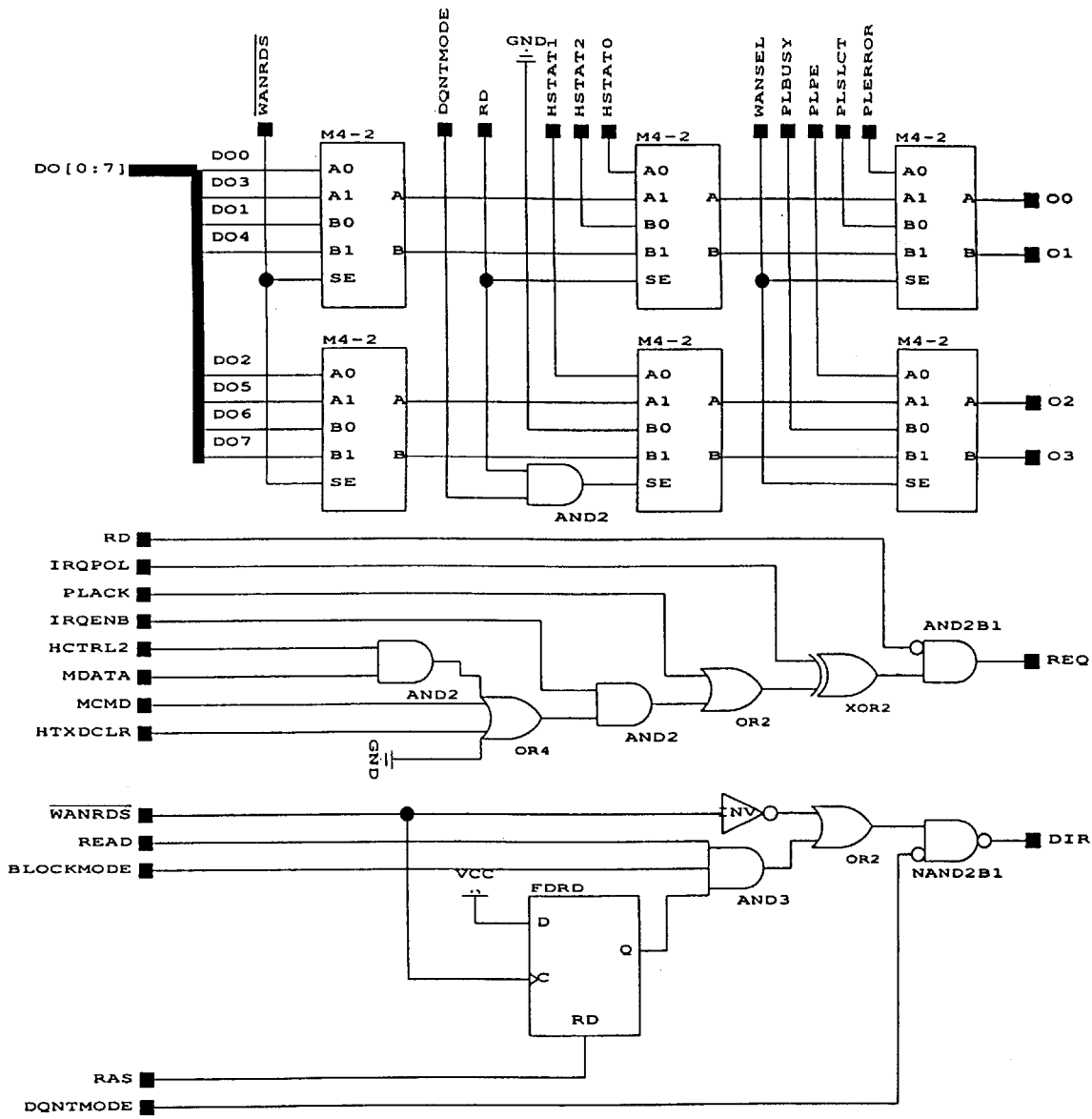
Figure 8L:
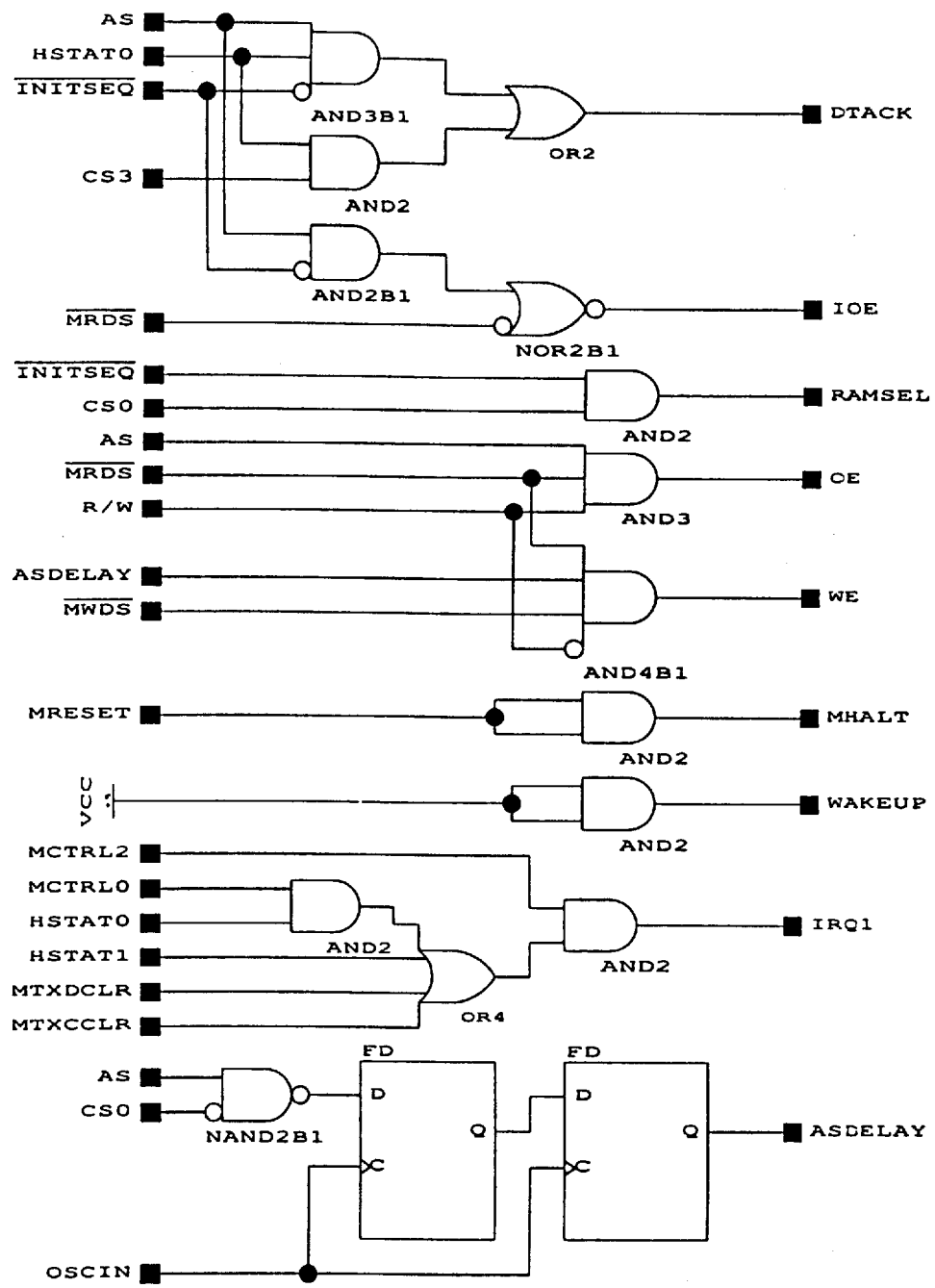

With reference now to FIG. 7, there is shown a block diagram of logic used in a preferred embodiment of selection logic contained within the parallel port controller 14 comprised of a multiplexor 88 and an AND gate 90. The AND gate 90 ANDs data bits 0–7 to determine whether or not a register access is directed to the modem control and interface 16 by recognizing addresses of Fx. This signal is used as a select signal to the multiplexor 88. The multiplexor 88 selectively passes the RDS and the RAS dependent upon the select input generated by AND gate 90. Additionally, a read/write signal is generated according to the selected register address for the modem control and interface 16 or the LAN control and interface 86. Schematic diagrams of the logic associated with a preferred embodiment as implemented within a FPGA are shown in FIGS. 8A–8I.

In a manner similar to that previously described in association with the modem control and interface 16, the LAN control and interface 86 is also capable of transferring data without continuous control from the PC 22. Thus, while the selection logic only permits the PC to communicate with either the modem control and interface 16 or the LAN control and interface 86 during each I/O operation, the other interface can concurrently communicate using local control. Thus, it should be apparent to one of ordinary skill in the art that simultaneous communications with a WAN and a LAN are possible with embodiments of the present invention.

With reference again to FIG. 6, the LAN control and interface 86 is comprised of three main portions, a LAN controller 92, an SRAM 94 and a LAN interface 96. The LAN controller 92 is coupled to the parallel port controller 14 via a data/control path 98 that functions as a PC interface to bidirectionally transfer data to the standard PC parallel port 20. The SRAM 94, coupled to the LAN controller 92 using path 100, temporarily stores packets of data that are transferred across a network 102, commonly referred to as a local area network (LAN). The LAN interface 96 is coupled to the LAN controller 92 using path 104 and conditions network data according to IEEE 802 to the LAN 102 through a connector 108. Connector 108 is coupled to the LAN interface 96 using path 106. Connector 108 may be either a BNC connector or a RJ-45 modular plug, depending upon the mode of operation required.

Figure 13A:
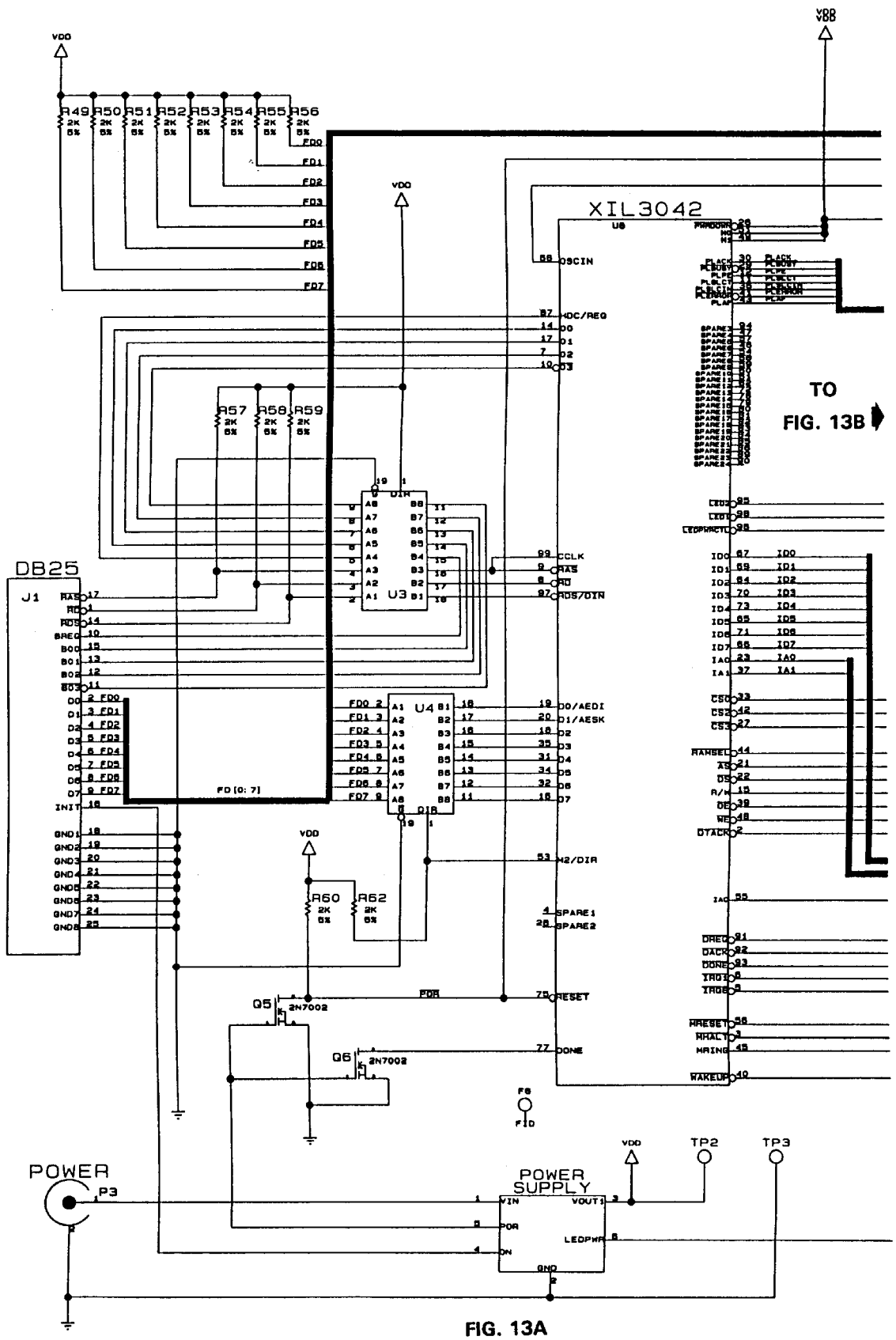
FIG. 13 is a top level schematic diagram of a preferred LAN/modem adapter.
Figure 13B:
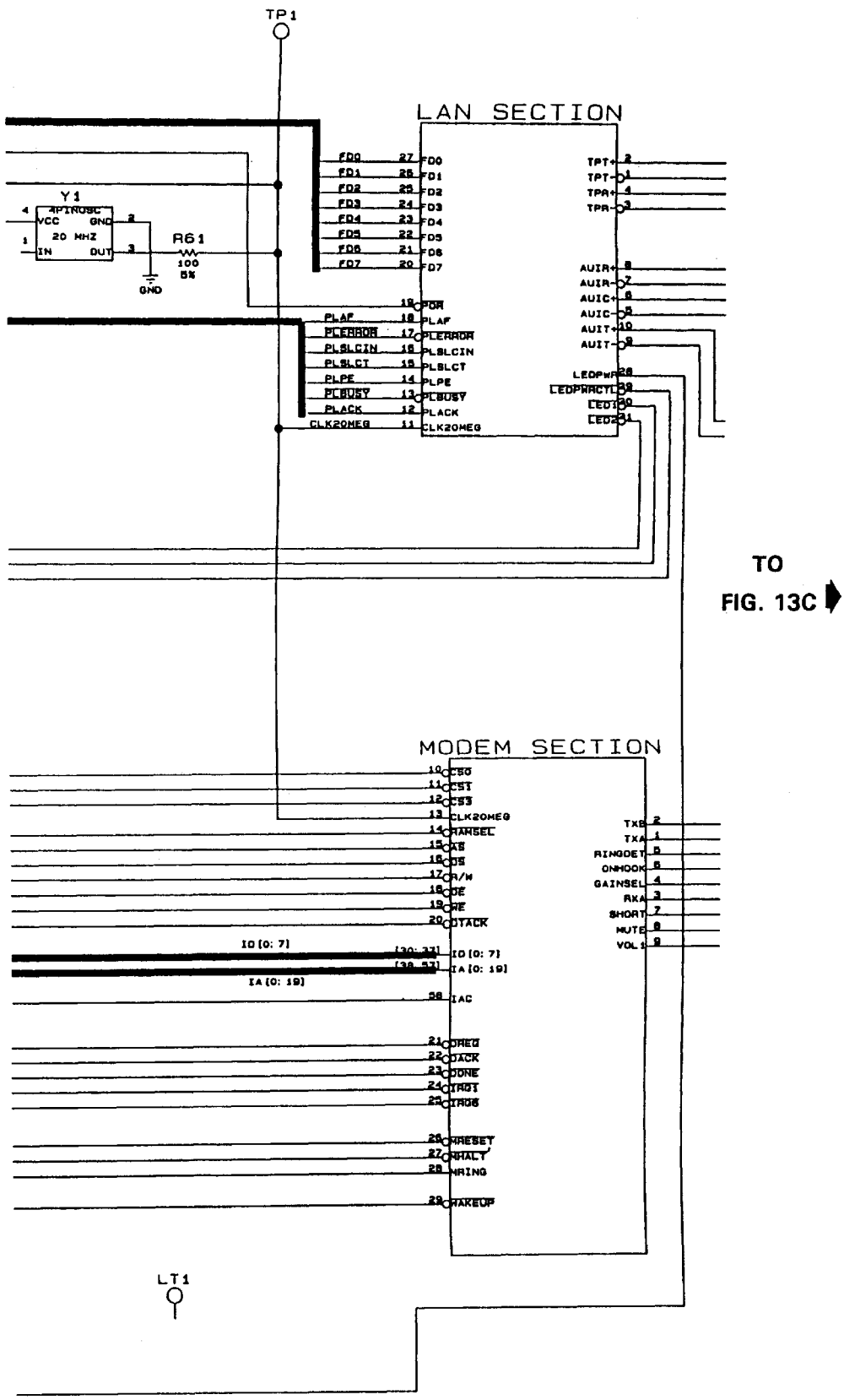

With reference to FIG. 13, there is shown a detailed schematic diagram of a preferred embodiment of a LAN/modem adapter. As shown in FIG. 13, a DB25 parallel port connector is coupled to a bidirectional buffer U3 and unidirectional buffer U4 which form the parallel port interface 12. A field programmable gate array (FPGA), U8, forms the parallel port controller 14 which controls both the interface to the parallel port and the selection/port sharing logic for the modem section (modem control and interface 16) and the LAN section (LAN control and interface 86). The detailed schematic diagram of the modem has already been shown in FIGS. 10, 11 and 12.

Figure 9:
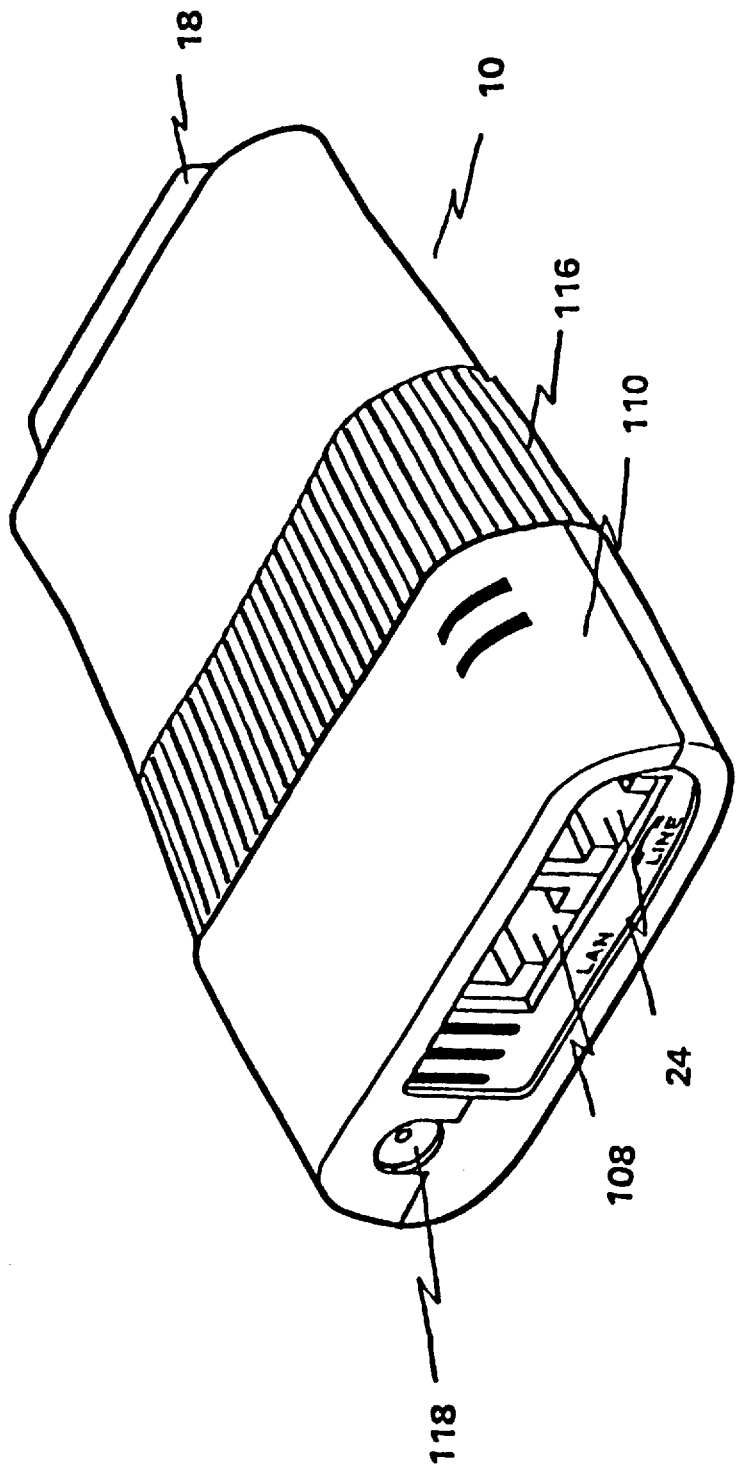
FIG. 9 is an isometric view showing a housing of a preferred embodiment in accordance with the present invention.

With reference now to FIG. 9, there is shown the external configuration of a preferred embodiment of the modem or alternatively LAN/modem adapter 10 in accordance with the present invention. The modem adapter 10 is comprised of a substantially enclosed rounded rectangular housing 110. The parallel port connector 18 is mounted on one end of the housing 110 for mating connection to the standard PC parallel port 20. The parallel port connector 18 is a 25-pin, male, D-shell connector which mates to a complementary female connector as found on the standard PC parallel port 20 of a personal computer (PC). First and second captive screws 112 and 114 (not shown) are mounted in the housing 110 for coupling to threaded holes typically provided adjacent to a standard PC parallel port connector. A tractor belt 116 is mounted for rotation within a recess around the circumference of the housing 110 and coupled to screws 112 and 114 to enable a user to cooperatively rotate the screws 112 and 114.

The RJ-11 connector 24 is mounted on the opposite end of the housing 110 and is configured to connect the modem adapter 10 to a public switched telephone network (PSTN). Connector 108 is also mounted on the opposite end of the housing 110. Connector 108 is configured to connect to a local area network media, e.g., an unshielded twisted pair Ethernet network using an RJ-45 connector. Alternatively, connector 108 is a BNC connector (not shown) for connecting to a coaxial cable as is used in standard Ethernet networks. The housing 110 additionally includes a socket 118 intended to receive a conventional AC adapter jack which supplies a DC voltage (e.g., 12 volt D.C. unregulated or 5 volt D.C. regulated) for providing power to the modem.

The rectangular housing 110 is preferably dimensioned to be substantially pocket sized so that it can be conveniently carried by a user. For example, the modem adapter 10 in accordance with the present invention currently being manufactured by the assignee of the present application has a length equal to approximately 4½ inches, a width equal to approximately 2½ inches, and a height equal to approximately 1 inch. The modem adapter 10 is intended to readily connect externally to any standard PC parallel port, thus eliminating the difficulties with prior art circuit board modems. The external configuration of the modem 10, as depicted in FIGS. 9A, 9B and 9C makes it particularly suitable for use with laptop computers and also for PCs in which the available slots, or power, are at a premium.

Although the present invention has been described in detail with reference only to the presently-preferred embodiments, those of ordinary skill in the art will appreciate that various modifications can be made without departing from the invention. Accordingly, the invention is defined by the following claims.

We claim:

1. A method of loading a first program into a programmatically controlled device for use with a computer and the device having a programmatic controller which controls said device in response to instructions accessed from a local memory associated with the device and instructions fetched from the computer, the method of loading said local memory comprising the steps of:
    causing said controller to fetch a first program of executable instructions from said computer; and
    having said controller execute said first program to at least partially control said device.

2. The method of claim 1, additionally comprising the steps of:
    accessing from said computer a second program of executable instructions;
    loading said second program of executable instructions into said local memory; and
    causing said controller to execute said second program of executable instructions from said local memory.

3. The method of claim 2, additionally comprising the steps of:
    loading a third program of executable instructions into said local memory from said computer by executing said second program; and
    controlling said device by causing said controller to execute said third program of executable instructions.

4. The method of claim 1, wherein fetching of said first program is done via a computer parallel port.

5. The method of claim 1, wherein at least a portion of said local memory retains its memory when power is removed.

6. The method of claim 5, wherein said local memory is comprised of at least one Flash storage device.

7. The method of claim 5, wherein said local memory is comprised of at least one EEPROM storage device.

8. The method of claim 1, wherein said device is configured as a LAN adapter.

9. The method of claim 1, wherein said device is configured as a modem adapter.

10. The method of claim 1, wherein said device is configured as a LAN/modem adapter.

11. A device for use with a computer having a processor and an internal bus,

The device comprising:
    a controller within the device and a read/write local memory operatively coupled thereto; and
    means responsive to a start signal for fetching a first program of executable instructions for said controller from said computer, whereby the controller executes the instructions to at least partially operate the device.

12. The device of claim 11, additionally comprising:

means responsive to said first program for causing said controller to load a second program of executable instructions from said computer internal bus into said local memory; and wherein
    said controller is operable to execute said second program of executable instructions from said local memory.

13. The device of claim 12, additionally comprising:

means responsive to said second program of executable instructions for causing said controller to load a third program of executable instructions from said computer into said local memory; and wherein
    said controller is operable to execute instructions from said third program for controlling said device.

14. The device of claim 11, wherein said start signal is a processor reset.

15. The device of claim 11, wherein said means for fetching executable instructions from said computer to said local memory is done via a computer parallel port.

16. The device of claim 11, wherein at least a portion of said local memory retains its memory when power is removed.

17. The device of claim 16, wherein said local memory is comprised of at least one Flash storage device.

18. The device of claim 16, wherein said local memory is comprised of at least one EEPROM storage device.

19. The device of claim 11, wherein said device is configured as a LAN adapter.

20. The device of claim 11, wherein said device is configured as a modem adapter.

21. The device of claim 11, wherein said device is configured as a LAN/modem adapter.

22. A method of bootstrapping executable code to a device with a controller from a computer, said method comprising, directing said controller to fetch and execute a first program of executable instructions from the computer.

23. The method of claim 22, additionally comprising the steps of:
   loading a local memory associated with the device with a second program of executable instructions fetched from the computer; and
   executing said second program of executable instructions from said local memory using said controller.

24. The method of claim 22, additionally comprising the step of connecting the device controlled by said controller to a computer parallel port comprised of an external 25-pin D-shell connector.

25. The method of claim 24, wherein said loading step fetches instructions from said computer parallel port under control of said controller.

26. The method of claim 24, wherein said directing step fetches and executes bytes from said computer parallel port.

27. The method of claim 23, additionally comprising the steps of:
   loading a third program of executable instructions into said local memory from said computer by executing said second program; and
   controlling said adapter by causing said controller to execute said third program of executable instructions.

28. The method of claim 22, wherein at least a portion of said local memory retains its memory when power is removed.

29. The method of claim 22, wherein said device is configured as a LAN adapter.

30. The method of claim 22, wherein said device is configured as a modem adapter.

31. The method of claim 22, wherein said device is configured as a LAN/modem adapter.

32. The method of claim 1, wherein said device is configured as an interface for a storage medium.

33. The method of claim 1, wherein said device is configured as an interface for a disk drive.

34. The method of claim 1, wherein said device is configured as an interface for a bus.

35. The method of claim 1, wherein prior to the fetching step, the local memory contains substantially no program.

36. The method of claim 2, wherein substantially all of the second program is loaded into the local memory.

37. A self-contained, dynamically self-loaded interface controller device for operation with a computer having a central processor and a communications port, the device comprising:
   an interface communicating with the communications port;
   a local memory associated with the device;
   a programmatic controller communicating with the computer through the interface and the communications port to operate the device according to at least one program;
   the programmatic controller responsive to a signal fetching the program through the interface from the computer and storing the program in the local memory for execution by the controller to at least partially operate the device.

38. The device of claim 37, wherein said fetching of said first program is done via a computer parallel port.

39. The device of claim 37, wherein said device is configured as a LAN adapter.

40. The device of claim 37, wherein said device is configured as a modem adapter.

41. The device of claim 37, wherein said device is configured as a LAN/modem adapter.

42. The device of claim 37, wherein said device is configured a controller interface for a storage medium.

43. The device of claim 37, wherein said device is configured as a controller interface for a disk drive.

44. The device of claim 37, wherein said device is configured as a controller interface for a bus.

45. The device of claim 37, wherein prior to fetching the program, the local memory contains substantially no program.

46. The device of claim 11, wherein prior to fetching the first program, the local memory contains substantially no program.

* * * * *